US010601936B2

(12) United States Patent
Tateno et al.

(10) Patent No.: US 10,601,936 B2
(45) Date of Patent: Mar. 24, 2020

(54) SERVER, CLIENT, CONTROL METHOD, AND NON-TRANSITORY COMPUTER READABLE MEDIUM

(71) Applicant: SONY CORPORATION, Tokyo (JP)

(72) Inventors: Kei Tateno, Tokyo (JP); Shinya Ohtani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 242 days.

(21) Appl. No.: 15/126,542

(22) PCT Filed: Jan. 6, 2015

(86) PCT No.: PCT/JP2015/050116
§ 371 (c)(1),
(2) Date: Sep. 15, 2016

(87) PCT Pub. No.: WO2015/146207
PCT Pub. Date: Oct. 1, 2015

(65) Prior Publication Data
US 2017/0093994 A1 Mar. 30, 2017

(30) Foreign Application Priority Data
Mar. 25, 2014 (JP) ................. 2014-061770

(51) Int. Cl.
*H04L 29/08* (2006.01)
*G06F 16/30* (2019.01)
(Continued)

(52) U.S. Cl.
CPC .......... *H04L 67/22* (2013.01); *G06F 16/9535* (2019.01); *G06Q 10/107* (2013.01);
(Continued)

(58) Field of Classification Search
CPC ....... H04L 67/22; H04L 67/42; H04L 67/306; H04L 51/32; G06F 17/30867; G06Q 10/107; G06Q 30/0269; G06Q 50/01
(Continued)

(56) References Cited

U.S. PATENT DOCUMENTS 9,258,264 B1\* 2/2016 Shoham .................. H04L 51/32
2006/0182045 A1\* 8/2006 Anderson ............... H04L 67/16
370/260
(Continued)

FOREIGN PATENT DOCUMENTS

CN 103631851 A 3/2014
EP 2701103 A2 2/2014
(Continued)

OTHER PUBLICATIONS

Extended European Search Report of EP Patent Application No. 15769636.0, dated Dec. 19, 2017, 09 pages.
(Continued)

*Primary Examiner* — Ruolei Zong
(74) *Attorney, Agent, or Firm* — Chip Law Group

(57) ABSTRACT

A server, a client, a control method, and a non-transitory computer-readable medium that can promote social interactions of users attending a specific event. The server includes a communication unit configured to receive a profile of a user or an interest signal indicating interest in a specific event along with identification information of the user from a client; an accumulation unit configured to accumulate the profile of the user in association with the identification information of the user; and a control unit configured to control the identification information to be stored in the accumulation unit in association with the specific event according to the interest signal, to search for a user having a profile similar to the received profile based on the identi-
(Continued)

fication information and create a group users of similar interests, and transmit information of the created group to the client before an opening of the specific event.

16 Claims, 33 Drawing Sheets

(51) Int. Cl.
  *G06F 16/9535*    (2019.01)
  *G06Q 50/00*    (2012.01)
  *G06Q 10/10*    (2012.01)
  *H04L 29/06*    (2006.01)

(52) U.S. Cl.
  CPC ........... *G06Q 50/01* (2013.01); *H04L 67/306* (2013.01); *H04L 67/42* (2013.01)

(58) Field of Classification Search
  USPC ........................................................ 709/217
  See application file for complete search history.

(56) References Cited

U.S. PATENT DOCUMENTS

| | | | | |
|---|---|---|---|---|
| 2007/0217585 | A1* | 9/2007 | Wollmershauser | H04M 3/4872 379/201.01 |
| 2011/0320536 | A1* | 12/2011 | Lobb | G06Q 50/01 709/205 |
| 2012/0136572 | A1* | 5/2012 | Norton | G01C 21/3407 701/465 |
| 2014/0012905 | A1* | 1/2014 | Roche | H04L 51/36 709/204 |
| 2014/0059040 | A1 | 2/2014 | Cha et al. | |
| 2014/0156746 | A1* | 6/2014 | Wheatley | H04L 67/22 709/204 |

FOREIGN PATENT DOCUMENTS

| | | |
|---|---|---|
| JP | 2009-295067 A | 12/2009 |
| JP | 2011-203914 A | 10/2011 |
| JP | 2013-077110 A | 4/2013 |
| JP | 2014-044721 A | 3/2014 |
| KR | 10-2014-0026305 A | 3/2014 |
| WO | 2014/030962 A1 | 2/2014 |

OTHER PUBLICATIONS

Ishibashi, et al., "A Communication Support System for Participants of an Event", Nara Institute of Science and Technology, Matsushita Electric Industrial Co., Ltd., Internet Initiative Japan Inc., pp. 581-584.

Kenichi Ishibashi et al., "Tag Match: A Communication Support System for Participants of an Event", Internet Initiative Japan Inc, DICOMO 2006, vol. 2006, No. 6, 2006, pp. 16 including 11 pages of English translation.

Office Action for JP Patent Application No. 2016-510059, dated Oct. 9, 2018, 11 pages of Office Action and 05 pages of English Translation.

Office Action for EP Patent Application No. 15769636.0, dated Jan. 23, 2020, 07 pages of Office Action.

* cited by examiner

SERVER, CLIENT, CONTROL METHOD, AND NON-TRANSITORY COMPUTER READABLE MEDIUM

CROSS REFERENCE TO RELATED APPLICATIONS

This application is a U.S. National Phase International Patent Application No. PCT/JP2015/050116 filed on Jan. 6, 2015, which claims priority benefit of Japanese Patent Application No. 2014-061770 filed in the Japan Patent Office on Mar. 25, 2014. Each of the above-reference applications is hereby incorporated herein by reference in its entirety.

TECHNICAL FIELD

The present disclosure relates to a server, a client, a control method, and a storage medium.

BACKGROUND ART

Since the past, music, sporting events, and the like have been exhibited in facilities such as stadiums, domes, halls, and clubs, and many people have been attending and enjoying such live events. The people attending such events mostly have similar interests or preferences.

In addition, communication between individuals has been actively performed through networks lately. As one type of service through a network, for example, there are community-creating services that are known as social networking services (SNSs), etc.

Patent Literature 1 mentioned below, for example, has proposed a community service like an SNS. In the technology disclosed in Patent Literature 1, on the condition that execution of proximity communication between a plurality of communication processing devices is confirmed, the users of the communication processing devices are registered as community members. Communication history data to be collated includes information such as the IDs of communication partners, communication times and dates, and communication execution locations, execution of actual proximity communication is confirmed based on the data, and then the users are set as registered community members. This process can prevent fictitious and nonexistent users such as ghost members from being registered.

CITATION LIST

Patent Literature

Patent Literature 1: JP 2009-295067A

SUMMARY OF INVENTION

Technical Problem

Since people who attend such events described above mostly have similar interests or preferences, when participate in new social interactions, event activity is expected to increase, such as when users invite each other to go to other events, but past technologies have not considered promoting such social interactions. For example, community services provided via networks such as the above-mentioned SNSs have not been specialized and used to stimulate actual social interactions among participants at an event taking place in an actual space or increase event activity.

In addition, Patent Literature 1 allows people who are assumed to have actually met each other on the condition that they perform proximity communication to be registered as members of a community, but does not mention promotion of communication among users that is specialized in events.

Therefore, the present disclosure proposes a server, a client, a control method, and a storage medium that can further promote social interactions of users attending a specific event.

Solution to Problem

According to the present disclosure, there is provided a server including: a communication unit configured to receive a profile of a user or an interest signal indicating interest in a specific event along with identification information of the user from a client; an accumulation unit configured to accumulate the profile of the user in association with the identification information of the user; and a control unit configured to perform control to cause the identification information of the user to be stored in the accumulation unit in association with the specific event according to the interest signal indicating interest in the specific event, to search for a user having a profile similar to the received profile of the user based on the identification information of the user associated with the specific event and to automatically create a group constituted of users of similar interests, and to transmit information of the created group to the client from the communication unit when it is a predetermined time before an opening of the specific event.

According to the present disclosure, there is provided a client including communication control unit configured to control a profile of a user or an interest signal indicating interest in a specific event to be transmitted from a communication unit to a server along with identification information of the user. The communication unit receives information of a group which is automatically created by the server based on the identification information of the user associated with the specific event and constituted of users having profiles similar to the profile of the user a predetermined time before an opening of the specific event.

According to the present disclosure, there is provided a control method including: receiving, by a communication unit, a profile of a user or an interest signal indicating interest in a specific event along with identification information of the user from a client; accumulating, in an accumulation unit, the profile of the user in association with the identification information of the user; and performing control to store the identification information of the user in the accumulation unit in association with the specific event according to the interest signal indicating interest in the specific event, to search for a user having a profile similar to the received profile of the user based on the identification information of the user associated with the specific event and automatically create a group constituted of users of similar interests, and to transmit information of the created group to the client from the communication unit when it is a predetermined time before an opening of the specific event.

According to the present disclosure, there is provided a storage medium storing a program that causes a computer to function as: a communication control unit configured to control a profile of a user or an interest signal indicating interest in a specific event to be transmitted from a communication unit to a server along with identification information of the user. The communication unit receives information of a group which is automatically created by the server based on the identification information of the user associated with the specific event and constituted of users having profiles similar to the profile of the user a predetermined time before an opening of the specific event.

Advantageous Effects of Invention

According to the present disclosure described above, social interactions among users attending a specific event can be further promoted.

Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In addition, description will be provided in the following order.

1. Overview of an event-specialized communication system according to an embodiment of the present disclosure
2. Basic configurations
2-1. Configuration example of a client
2-2. Configuration example of a server
3. Operation processes
3-1. Group creation process
3-2. Friend registration process
4. Screen display examples
4-1. At the time of initial activation
4-2. Event
4-3. Account
4-4. Talk
4-5. Activity
4-6. Other
5. Conclusion <<1. Overview of an Event-specialized Communication System According to an Embodiment of the Present Disclosure>>

Figure 1:
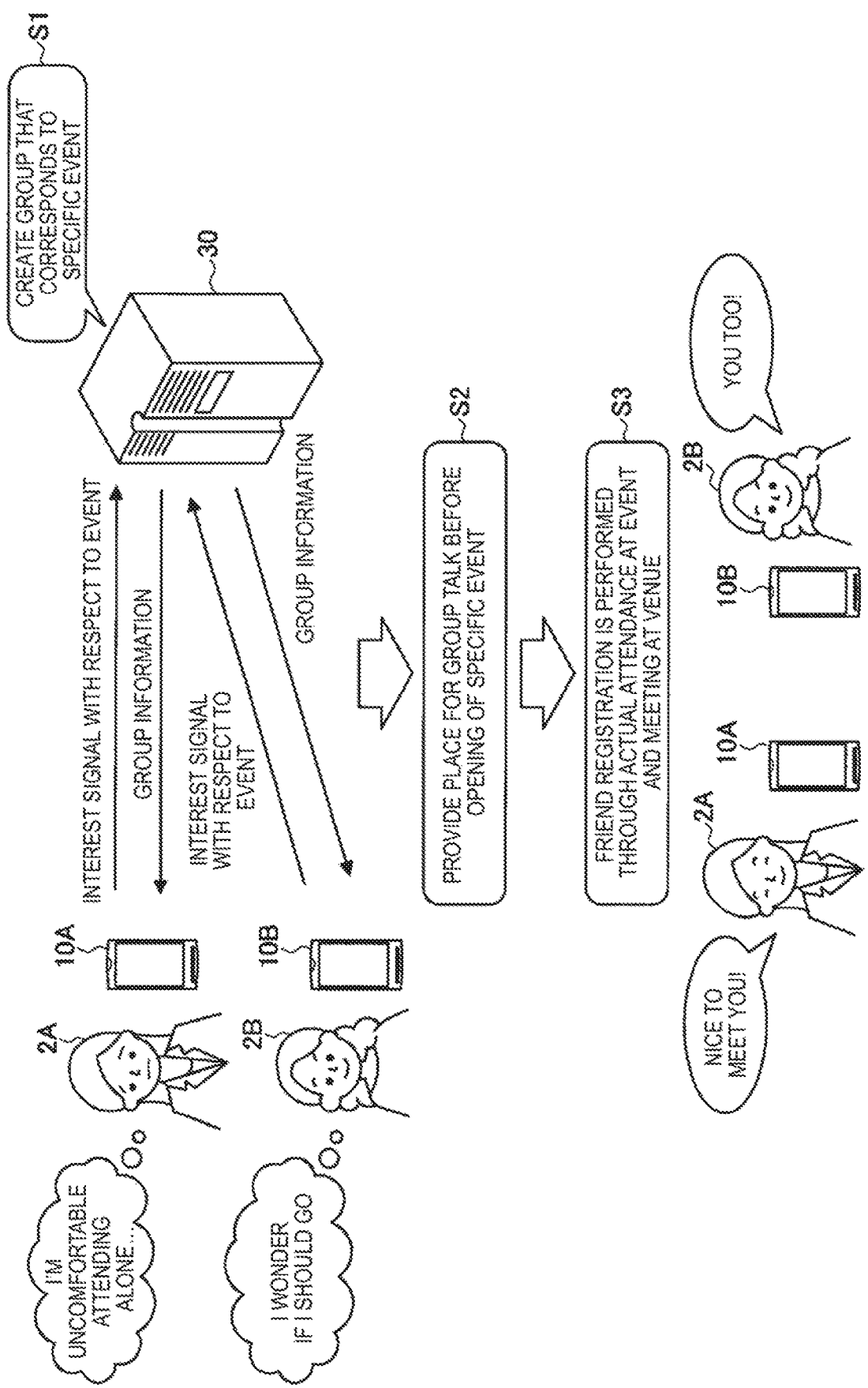
FIG. 1 is a diagram describing an overview of an event-specialized communication system according to an embodiment of the present disclosure.

First, an overview of an event-specialized communication system according to an embodiment of the present disclosure will be described with reference to FIG. 1. FIG. 1 is a diagram describing the overview of the event-specialized communication system according to the embodiment of the present disclosure. Here, an event refers to an occasion such as a music or sporting event, a play, any of various exhibitions (a fashion show, a motor show, a game show, etc.), a company presentation, a workshop, a competition, or the like taking place in a facility in a real space, for example, a stadium, a dome, a hall, a club, an amusement park, or the like.

As shown in FIG. 1, the event-specialized communication system according to the present embodiment includes clients 10A and 10B that users 2A and 2B use, respectively, and a server 30.

The clients 10A and 10B are information processing devices realized as, for example, smartphones, mobile telephone terminals, tablet terminals, personal computers (PCs), cameras, game devices, music players, or the like.

The server 30 is connected with the clients 10A and 10B via the Internet to perform data communication.

(Background)

Here, even if a user thinks she wants to attend, for example, a music or sport event taking place in a stadium, a dome, a hall, or the like, she may feel uncomfortable with attending for the first time or attending alone and thus may give up on attending. In addition, even if she attends the event, it is difficult to get to know a new person or initiate a conversation at the venue.

Thus, in the present embodiment, social interactions of users who attend a specific event are further promoted by creating a group constituted of users of similar interests among a plurality of users expressing their interest in a specific event.

Specifically, first, the users 2A and 2B transmit interest signals indicating their interest in a specific event input through the clients 10A and 10B to the server 30 from the clients 10A and 10B as shown in the upper part of FIG. 1. The server 30 that has received the interest signals creates a group constituted of a plurality of users of similar interests among the users expressing their interest in the specific event (S1). The similarity of the users of whether they have similar interests or preferences is determined based on, for example, profiles of the users.

The server 30 transmits information of the created group to the clients 10A and 10B of the users 2A and 2B included in the same group. Accordingly, the users 2A and 2B come to know that they belong to the same group.

In addition, the server 30 controls the group information to be transmitted so that the users 2A and 2B have temporary ties and perform mutual communication within the group via a network (hereinafter referred to also as a group talk) a predetermined time before an opening of the specific event in which both users express their interest, as shown at the center of FIG. 1 (S2). Since, before actually attending the specific event, the users having similar interests or preferences who will attend the specific event can talk together within the group created based on the users, their motivation to attend the event is promoted, and discomfort that may be caused by attending the event alone can also be resolved because they can get to know each other beforehand.

In addition, once the users 2A and 2B actually attend the event and meet each other at the venue, they are registered as friends (which will also be referred to as event-mates in the present specification) as shown in the lower part of FIG. 1 (S3). Thereafter, mutual communication by the individuals (which will also be referred to as a mate talk in the present specification) is possible between the users 2A and B via the network, social interactions between the users are promoted, the number of participants in events increases as they invite each other to other events, and therefore event activity increases.

<<2. Basic Configurations>>

<2-1. Configuration Example of a Client>

Figure 2:
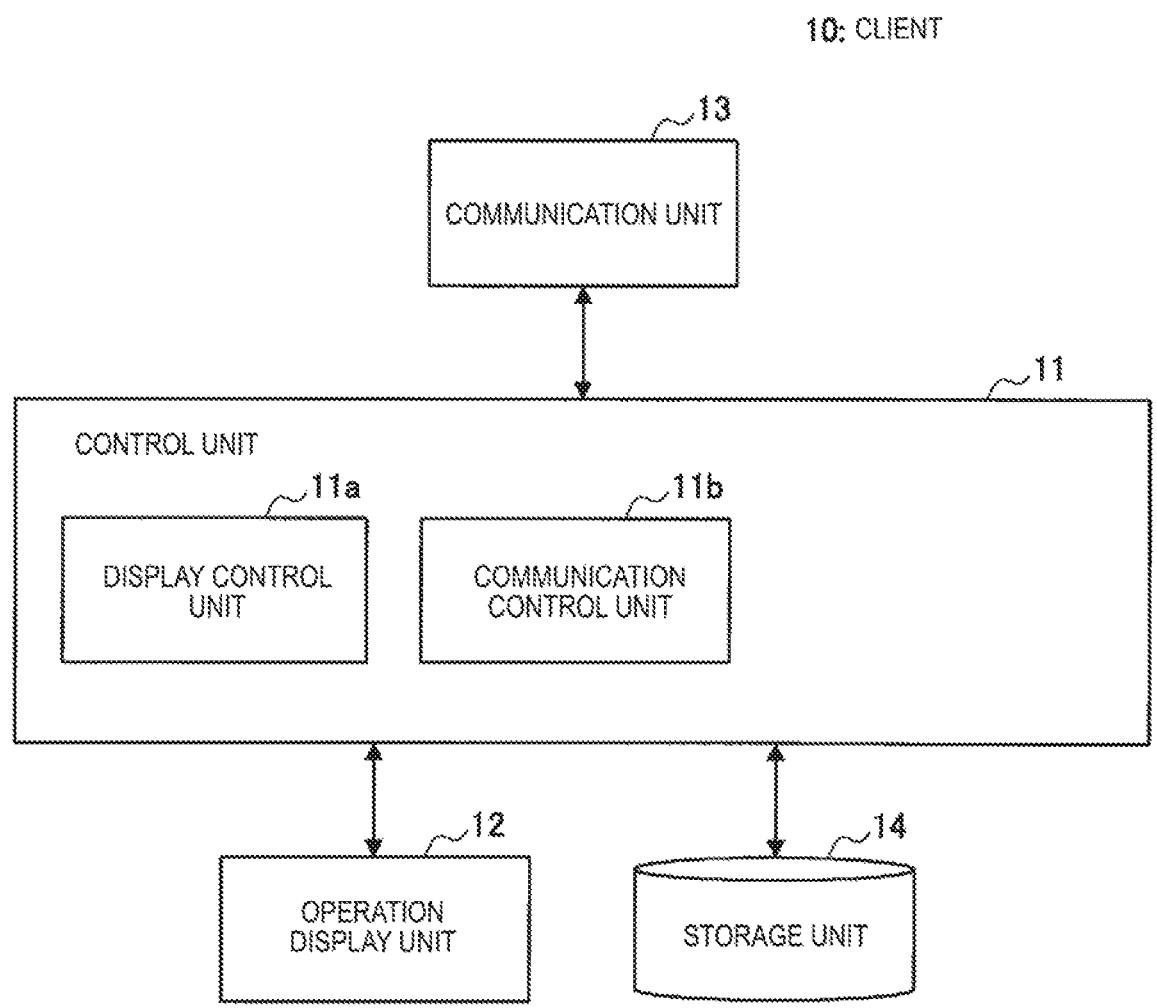
FIG. 2 is a block diagram showing a basic configuration example of a client according to the present embodiment.

Next, a configuration of a client 10 included in the event-specialized communication system according to the present embodiment will be described with reference to FIG. 2. FIG. 2 is a block diagram showing a basic configuration example of the client 10 according to the present embodiment.

The client 10 has a control unit 11, an operation display unit 12, a communication unit 13, and a storage unit 14 as shown in FIG. 2.

The control unit 11 is configured by, for example, a micro-computer that includes a central processing unit (CPU), a read only memory (ROM), a random access memory (RAM), a non-volatile memory, and an interface unit, and controls respective constituent elements of the client 10.

In addition, the control unit 11 according to the present embodiment functions as a display control unit 11a and a communication control unit 11b as shown in FIG. 2.

The display control unit 11a performs generation and display control of a screen displayed on the operation display unit 12. The display control unit 11a according to the present embodiment generates and displays various screens such as a registration screen, an event lobby screen, a user search screen, and a talk screen according to control from an application that is for using the event-specialized communication system activated in the client 10. In addition, when these various screens are to be generated, the display control unit 11a uses screen display information received from the server 30 when necessary.

The communication control unit 11b has a function of controlling communication with external devices. For example, the communication control unit 11b performs control of being connected with the server 30 and transmitting the profile of a user or an interest signal indicating interest in a specific event to the server 30 along with identification information of the user. In addition, the communication control unit 11b performs control of transmitting an attendance signal indicating that the user is attending the specific event to the server 30. In addition, the communication control unit 11b controls information indicating that the user (a first user) has actually met another user (a second user) when she attends the specific event to be transmitted to the server 30.

The communication unit 13 is connected with the Internet, and has a function of communicating with the server 30. For example, the communication unit 13 transmits the profile of the user, the interest signal indicating her interest in the specific event, and the like according to control of the communication control unit 11b. In addition, the communication unit 13 receives information of a group that is automatically created by the server 30 based on the identification information of the users associated with the specific event and is constituted of users having profiles similar to the profile of the user a predetermined time before the opening of the specific event.

The operation display unit 12 has the functions of a display unit and an operation unit, and can be realized as, for example, a touch panel display. The function of a display unit is realized as, for example, a liquid crystal display, an organic EL display, or the like, to display text, images, and other information on a display screen. In addition, the function of an operation unit is realized as an operation plane that, for example, is superimposed on the display screen and detects contact positions of users.

The storage unit 14 stores programs for executing various processes of the control unit 11.

The basic configuration of the client 10 according to the present embodiment has been described above. Next, a basic configuration of the server 30 included in the event-specialized communication system according to the present embodiment will be described.

<2-2. Configuration Example of a Server>

Figure 3:
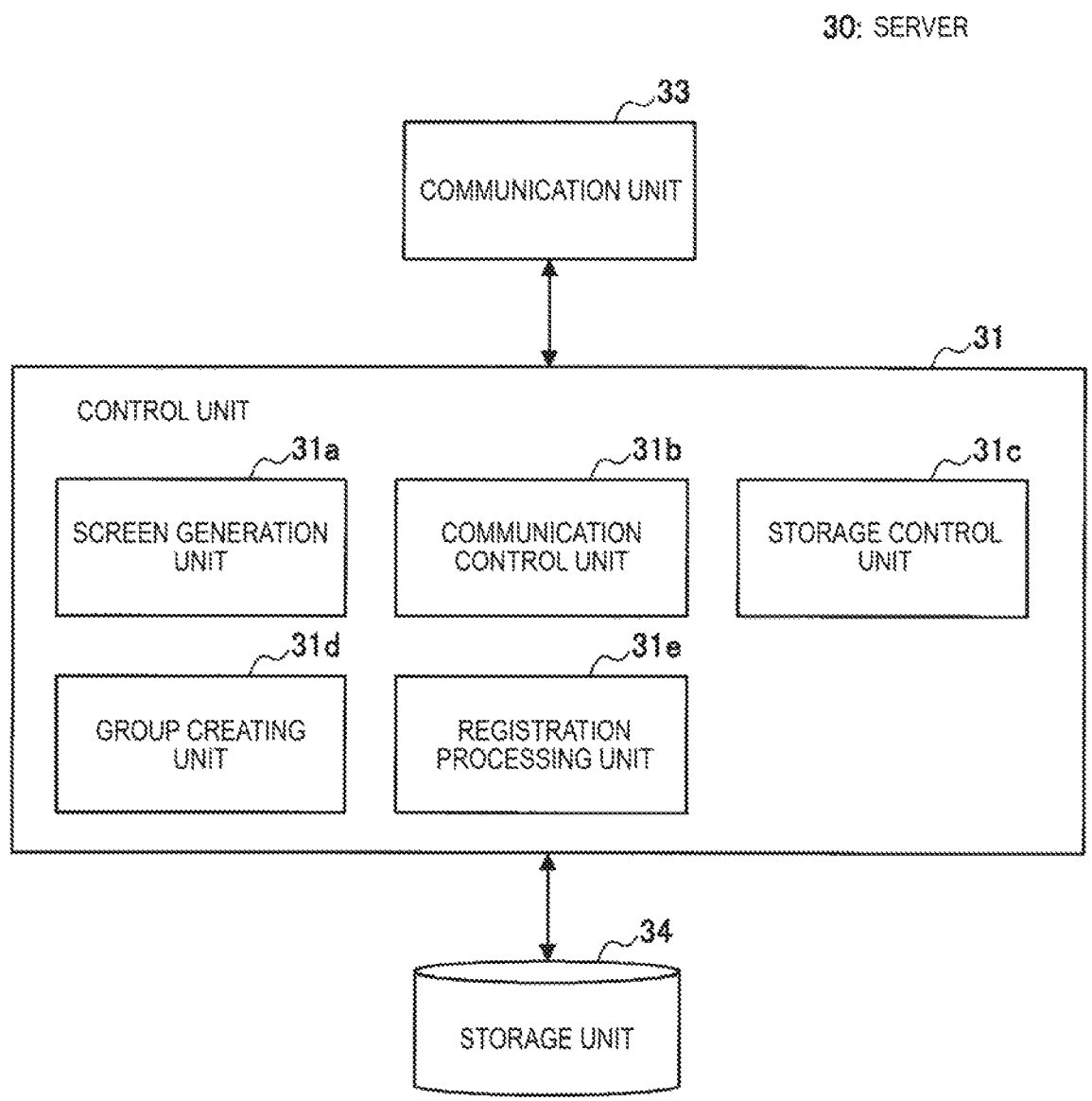
FIG. 3 is a block diagram showing a configuration example of a server according to the present embodiment.

FIG. 3 is a block diagram showing a configuration example of the server 30. As shown in FIG. 3, the server 30 has a control unit 31, a communication unit 33, and a storage unit 34.

The control unit 31 is configured by, for example, a micro-computer that includes a CPU, a ROM, a RAM, a non-volatile memory, and an interface unit, and controls respective constituent elements of the server 30.

In addition, the control unit 31 according to the present embodiment functions as a screen generation unit 31a, a communication control unit 31b, a storage control unit 31c, a group creating unit 31d, and a registration processing unit 31e as shown in FIG. 3.

The screen generation unit 31a generates information of a screen displayed on the operation display unit 12 of the client 10 (display screen information). For example, the screen generation unit 31a generates information necessary for causing various screens such as the registration screen, the event lobby screen, the user search screen, or the talk screen to be displayed. Specific examples of display screens will be described with reference to FIGS. 6 to 33.

The communication control unit 31b has a function of controlling communication with external devices via the communication unit 33. For example, the communication control unit 31b receives profiles of users, interest signals indicating interest in a specific event, attendance signals indicating attendance at a specific event, and the like from the client 10. In addition, the communication control unit 31b transmits the display screen information generated by the screen generation unit 31a to the client 10. In addition, the communication control unit 31b controls information of a group created by the group creating unit 31d to be described below (group information) to be transmitted to the client 10 of a user 2 included in the group. Note that the group information can be transmitted a predetermined time before an opening of a specific event.

The storage control unit 31c controls the storage unit 34 to store profiles of users and the like received by the communication unit 33 from the client 10. In addition, the storage control unit 31c controls the storage unit 34 to store identification information of users in association with a specific event according to interest signals indicating interest in the specific event received by the communication unit 33 from the client 10. In addition, the storage control unit 31c also controls the storage unit 34 to store an attendance signal indicating attendance at a specific event, a signal indicating meeting another user at a specific event, and the like received by the communication unit 33 from the client 10.

The attendance signal indicating attendance at a specific event is transmitted from the client 10 to the server 30 when a user performs an operation of expressing the attendance at the event with the client 10. An operation of expressing attendance at an event is, for example, an operation of tapping a "I'm attending this event" button 561 that is included on an event lobby screen 56 shown in FIG. 14, an operation of tapping a "Register in attendance history" button displayed after closing of an event on an event details screen 52 shown in FIG. 12, and the like.

The group creating unit 31d refers to information stored in the storage unit 34 to search for users having similarity in the profiles of the users based on identification information of the users associated with a specific event (a user expressing interest in the specific event), and automatically creates a group constituted of users of similar interests.

For example, the group creating unit 31d collates preference information and behavioral tendencies like favorite artists, events that users go to often, frequencies of going to events, and the like included in the profiles of the users, determines users who like the same artist or users who often go to similar events as users of similar interests, and then creates a group.

In addition, the group creating unit 31d collates demographic information such as sexes, ages, and the like of the users, creates a group of the same sex or the same generation, and thus can offer a situation in which the users can easily make friends even on their first meeting.

Furthermore, the group creating unit 31d may determine users of similar interests by adding predetermined weights to the profiles of the users. That is, based on interactions between respective users, the group creating unit 31d adds a weight to the profile of another specific user of whom a user has expressed a favorable impression to determine the other user as a user of similar interests, and then creates a group. An interaction of a user corresponds to, for example, tapping of a "Want to invite to the group" button 591 included in a lobby card display screen 59 of another user shown in FIG. 17, or tapping a "Good" button (not shown) indicating a favorable impression of the profile of another user (see FIG. 19).

The group created in the present embodiment is, for example, a group constituted of a small number of users (for example, about 4 or 5 persons) who are encouraged to meet each other in an event venue. In addition, the group creating unit 31d decides a group name, a group symbol, a color combination, or the like.

Information with regard to the group created as described above is output to the communication control unit 31b.

When the registration processing unit 31e refers to the information stored in the storage unit 34 and extracts information indicating that first and second users have met each other in a specific event that the respective users actually attended, the unit performs a friend (event-mate) registration process for both users by causing the storage unit 34 to store information indicating that the users are friends with each other. In addition, the registration processing unit 31e does not necessarily abide by the condition that respective users actually attend an event (reception of an attendance signal), and may perform the friend (event-mate) registration process when the information indicating that the first and the second users have met each other is extracted.

The communication unit 33 is connected with the Internet, and has a function of performing communication with the client 10 carried by each user. For example, the communication unit 33 receives the profiles of the users, interest signals indicating interest in a specific event, or the like from the client 10. In addition, the communication unit 33 transmits information of a group that is automatically created based on identification information of the users associated with the specific event and is constituted of users having profiles similar to the profile of a user to the client 10 a predetermined time before the opening of the specific event (for example, 24 hours before) according to control of the communication control unit 31b. In addition, the communication unit 33 receives an attendance signal indicating attendance at the specific event or a signal indicating that the user has actually met another user at the specific event from the client 10.

The storage unit 34 stores programs for execution of various processes to be performed by the control unit 31. In addition, the storage unit 34 stores the profiles of the respective users as described above. Furthermore, the storage unit 34 stores the identification information of the respective users in association with the specific event indicating interest of the users. In addition, the attendance signal indicating attendance at the specific event, the signal indicating meeting with another user, and the like are stored as well in association with the specific event.

The specific configuration of the server 30 according to the present embodiment has been described. Next, a specific operation process of the present embodiment will be described.

<<3. Operation Processes>>

The event-specialized communication system according to the present embodiment executes a group creation process with regard to group creation performed before a specific event opens and a friend registration process triggered by the fact that a user meets another user when she actually attends the event.

The group creation process will be described in detail with reference to FIG. 4, and then the friend registration process will be described in detail with reference to FIG. 5 below.

<3-1. Group Creation Process>

Figure 4:
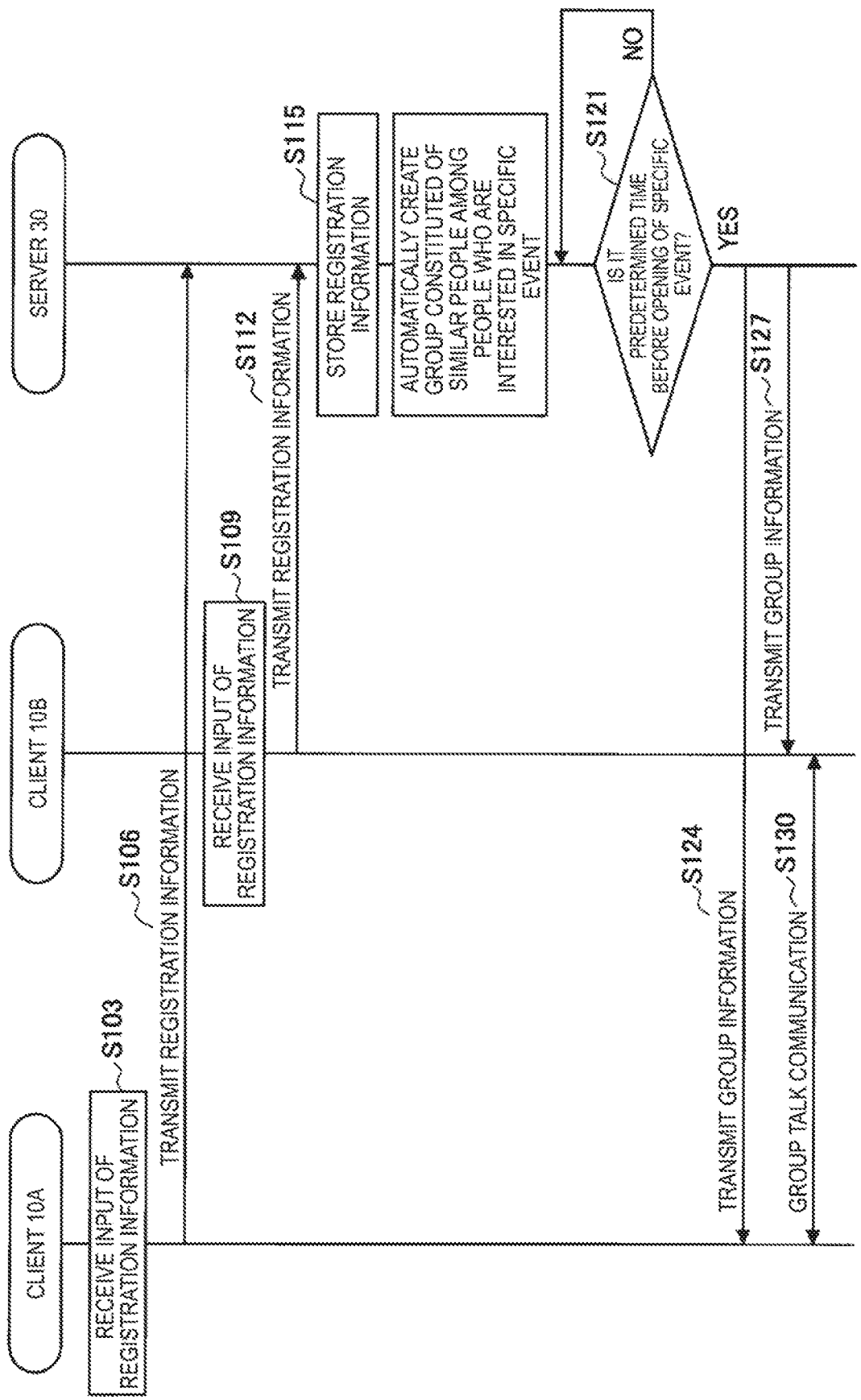
FIG. 4 is a sequence diagram showing a group creation process according to the present embodiment.

FIG. 4 is a sequence diagram showing a group creation process according to the present embodiment. As shown in FIG. 4, first, the client 10A receives an input of registration information including a profile of the user 2A in Step S103. The registration information can be input from the registration screen displayed on the operation display unit 12. A display example of the registration screen will be described with reference to FIG. 9. The registration information includes the profile of the user and information of a specific event in which the user is interested (an interest signal).

Next, in Step S106, the client 10A transmits the input registration information to the server 30.

Meanwhile, in Step S109, an input of registration information of the user 2B is performed in the client 10B as well in the same manner, and in S112, the registration information is transmitted to the server 30.

Next, in Step S115, the storage control unit 31c of the server 30 controls the registration information transmitted from the clients 10 of the respective users 2 to be stored in the storage unit 34. At this time, the storage control unit 31c causes identification information of the users who are interested in the specific event (nicknames, client numbers, and the like) to be stored in association with the specific event.

Next, in Step S118, the group creating unit 31d refers to the storage unit 34 and automatically creates a group constituted of people having similar user profiles among people who are interested in the specific event (based on identification information of the users associated with the specific event).

Next, in Step S121, the communication control unit 31b determines whether or not it is a predetermined time before the opening of the specific event for which the group has been created.

Next, if it is the predetermined time before the opening of the specific event (Yes in S121), the communication control unit 31b transmits information of the group created in S118 above to the clients 10 of the users who are included in the group in Steps S124 and S127.

Next, in Step S130, the clients 10A and 10B perform mutual communication via a network between the users (also referred to as a group talk) who are included in the same group created for the specific event based on the information of the group transmitted from the server 30. The group talk is controlled by the control unit 31 of the server 30 to be performed from the predetermined time before the opening of the specific event to a predetermined time after closing thereof. After the predetermined time, the group talk is frozen, for example, writing is not possible but reading is possible. A display example of a frozen group talk will be described below with reference to FIG. 22.

As described above, a group constituted of users of similar interests among a plurality of users expressing their interest in the same event is created for the specific event, a place for a group talk is provided to each of the users included in the group, and therefore the users can have social interactions with other users within the same group a predetermined time before the opening of the specific event.

The group creation process has been described above in detail. When a group is created and a group talk via a network is possible a predetermined time before an opening of a specific event as described above, a user can have social interactions with other users who have similar preference beforehand, and therefore the user's motivation to attend the event can be promoted even when, for example, the user attends the event alone or attends the event for the first time. Note that, in S124 and S127, the communication control unit 31b may also transmit information of a screen for displaying the information of the group (see FIG. 15) generated by the screen generation unit 31a.

<3-2. Friend Registration Process>

Next, the friend registration process triggered by the fact that members of the same group actually meet at an event venue at an opening of a specific event will be described with reference to FIG. 5. The event-specialized communication system according to the present embodiment provides a place for a group talk via a network, and thereby promotes social interactions (ties) between users in a real space and performs friend registration based on the ties in the real space.

Figure 5:
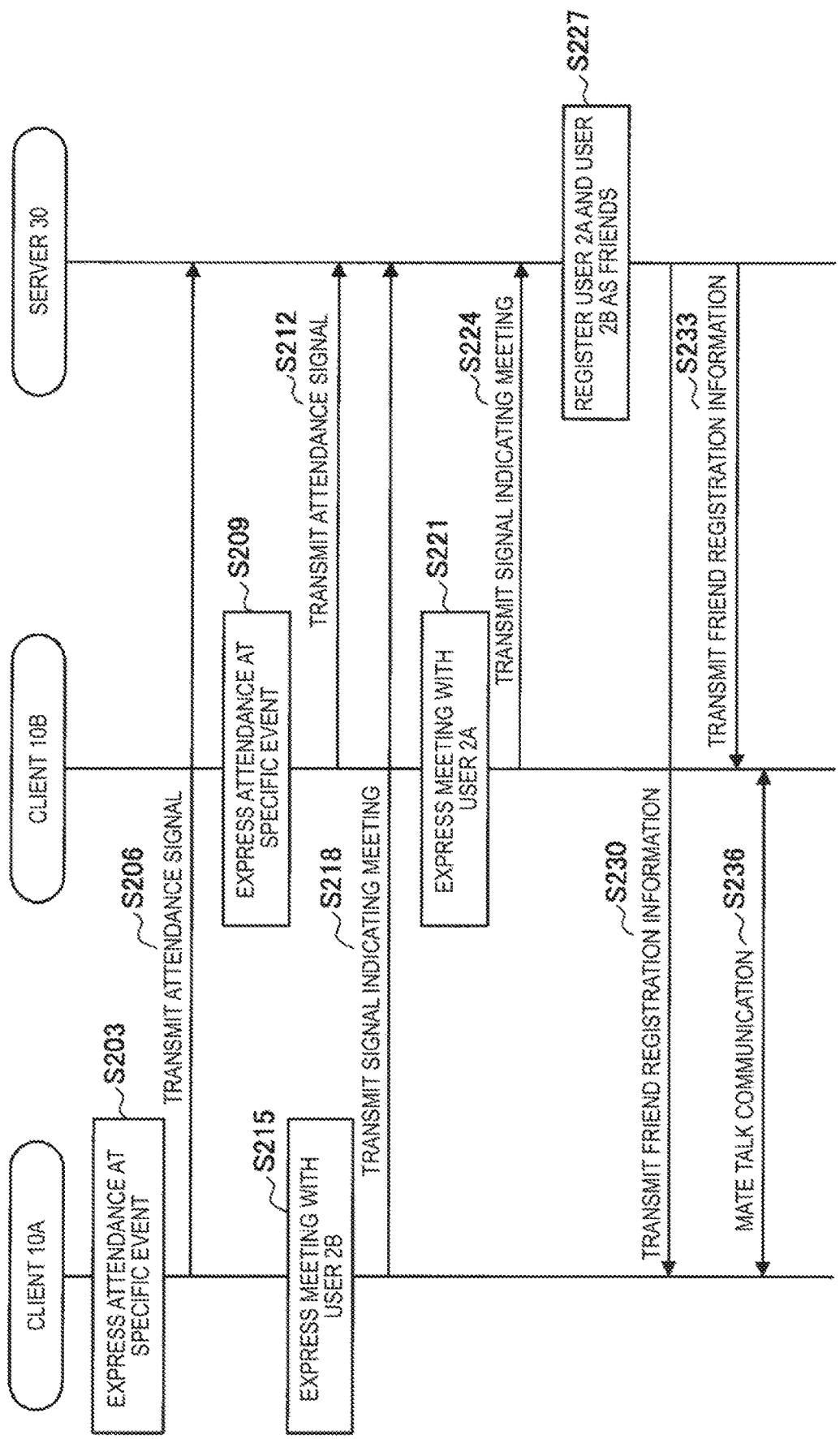
FIG. 5 is a sequence diagram showing a group creation process according to the present embodiment.

FIG. 5 is a sequence diagram showing the friend registration process according to the present embodiment. As shown in FIG. 5, first, the client 10A recognizes that attendance of the user 2A at a specific event is experssed in Step S203. The expression of attending the specific event is an input of information indicating actual attendance at the specific event, and can be recognized through an operation of tapping a button, for example, the "I'm attending this event" button on the screen to be described below with reference to FIG. 14.

Next, in Step S206, the client 10A transmits an attendance signal to the server 30.

Meanwhile, the client 10B also recognizes that attendance of the user 2B at the specific event is expressed likewise in Step S209, and transmits an attendance signal to the server 30 in S212.

Next, in Step S215, the client 10A recognizes expression of the fact that the user 2A has actually met another user (for example, the user 2B) at a venue of the specific event. The fact that the user has met the user 2B is expressed through an input of information indicating the meeting of the other user, and can be recognized through an operation of tapping, for example, a "Met" button on the screen to be described below with reference to FIG. 15.

Next, in Step S218, the client 10A transmits a signal indicating that the user 2A met the user 2B to the server 30.

Meanwhile, the client 10B also recognizes expression of the fact that the user 2B met another user (for example the user 2A) likewise in Step S221, and transmits a signal indicating that the user 2B met the user 2A to the server 30 in S224.

Successively, in Step S227, the server 30 stores the signals indicating the meetings with another user transmitted from the respective clients 10 in the storage unit 34, collates the stored data, and then registers the users who have expressed that they met each other (for example, the user 2A and the user 2B) as friends. Specifically, the registration processing unit 31e of the server 30 performs a registration process for both users (an event-mate registration process) by, for example, causing the storage unit 34 to store information indicating that the user 2A and the user 2B are friends. Note that, in the example shown in FIG. 5, the registration processing unit 31e performs the registration process when the attendance signals are received in S206 and S212 described above and the signals indicating the meetings with another user are received in S216 and S224 described above. However, the communication system according to the present embodiment is not limited thereto, and the registration process may be performed when the signals indicating the meetings with another user are received even if the attendance signals are not received.

Next, in Step S230 and S233, the communication control unit 31b transmits friend registration information to the clients 10 of the respective users for whom friend registration has been performed.

Next, in Step S236, the clients 10A and 10B perform mutual communication as friends via a network (which will also be referred to as a mate talk) based on the friend registration information transmitted from the server 30.

By performing the friend registration process for the users triggered by the fact that they actually met at the venue of the specific event, not only communication via a network but also ties established in a real space can be considered.

The friend registration process has been described above in detail. Well-matched people who actually meet in a real space are registered as friends as described above, a mate talk between the friends via a network is possible, and thus, for example, they can invite each other to other events, which results in an increase in the number of people who attend the events, and therefore the events become more active. Note that, in S230 and S233 described above, the communication control unit 31b may also transmit information of a screen for displaying information of other users (event-mates) who have been registered as friends (see the "Mates in the event lobby" shown on the right side of FIG. 12 and the "Mate" shown in FIG. 18) generated by the screen generation unit 31a.

<<4. Screen Display Examples>>

Next, display examples of various screens displayed on the operation display unit 12 of each client 10 when the event-specialized communication system according to the present embodiment is used will be described in detail with reference to FIGS. 6 to 33. Note that the various screens displayed on the operation display unit 12 may be displayed by the display control unit 11a of the client 10 based on the display screen information generated by the screen generation unit 31a of the server 30 described above.

<4-1. At the Time of Initial Activation>

First, screen display examples at the time of initial actuation of an application for using the event-specialized communication system according to the present embodiment will be described with FIGS. 6 to 9.

(Splash)

Figure 6:
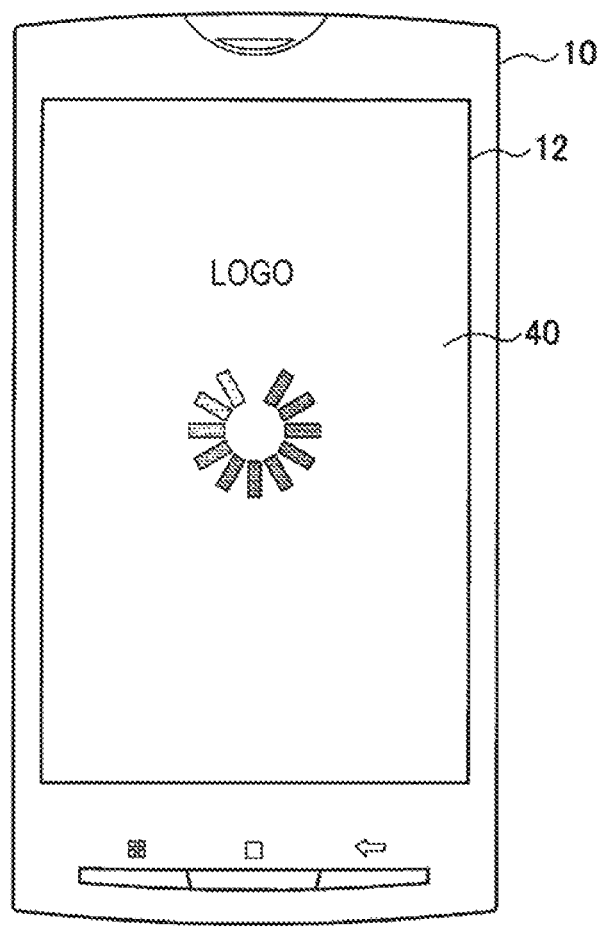
FIG. 6 is a diagram showing an example of a splash screen.

FIG. 6 is a diagram showing an example of a splash screen 40. The splash screen 40 is displayed on the operation display unit 12 of each client 10 while activation of the event-specialized communication system is awaited. At the time of the initial activation, the screen transitions to an instruction screen 42 to be described next with reference to FIG. 7, and transitions to an activity screen 73 to be described below with reference to FIG. 28 at the time of second and succeeding activations.

(Instruction)

Figure 7:
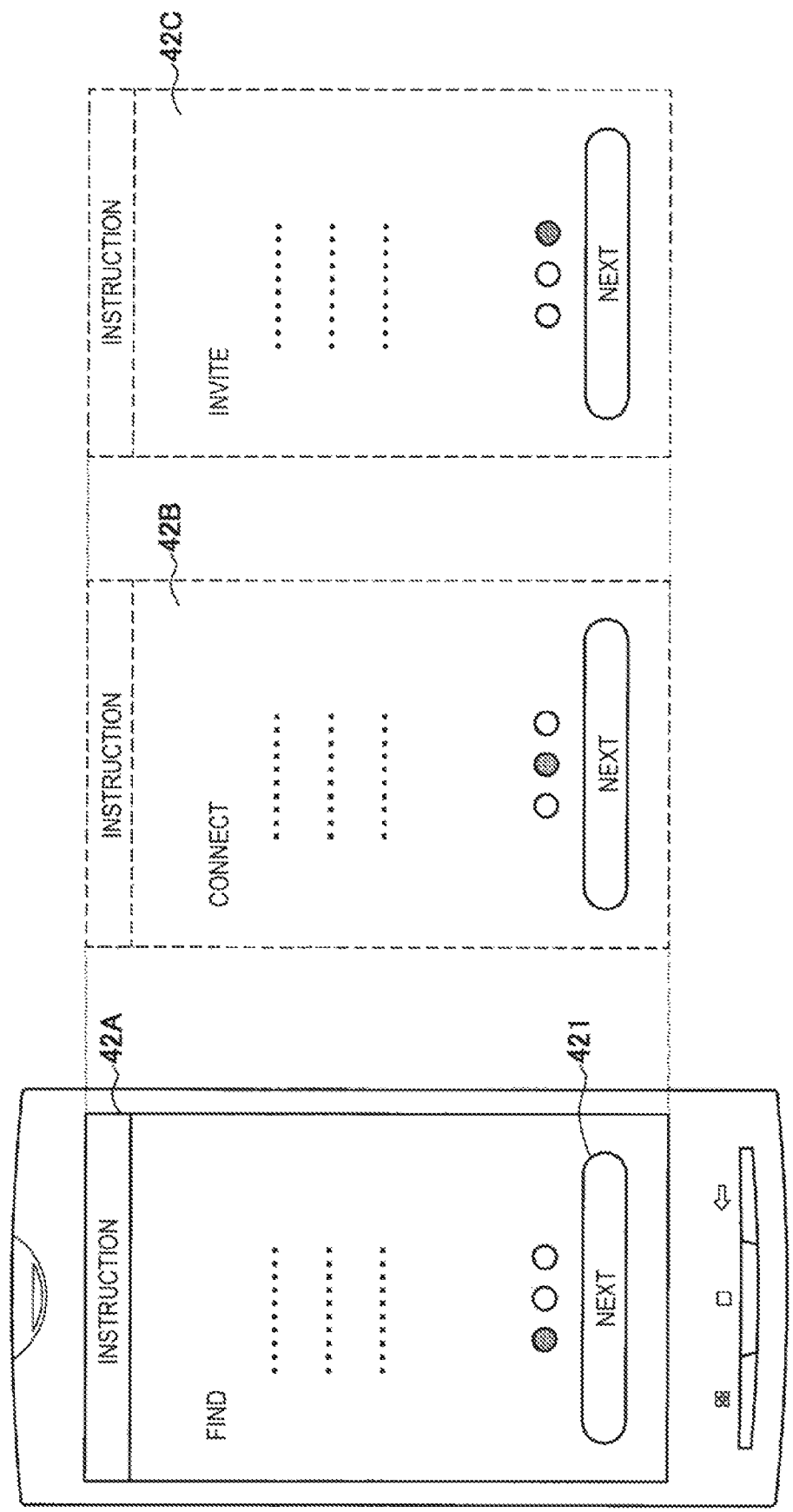
FIG. 7 is a diagram showing an example of an instruction screen.

FIG. 7 is a diagram showing an example of the instruction screen 42. On the instruction screen 42, the use method of the present application is described using simple illustrations and sentences. In addition, the instruction screen 42 is constituted by, for example, a first instruction screen 42A describing a method for finding an event, a second instruction screen 42B describing ties with other users, and a third instruction screen 42C describing a method for inviting another user. In addition, the plurality of instruction screens 42A, 42B, and 42C are displayed in carousel UIs, and are sequentially displayed according to, for example, swipe operations of a user. In addition, when a "Next" button 421 displayed in a lower part of the instruction screen 42 is tapped, the screen transitions to a login screen to be described next with reference to FIG. 8.

(Login)

Figure 8:
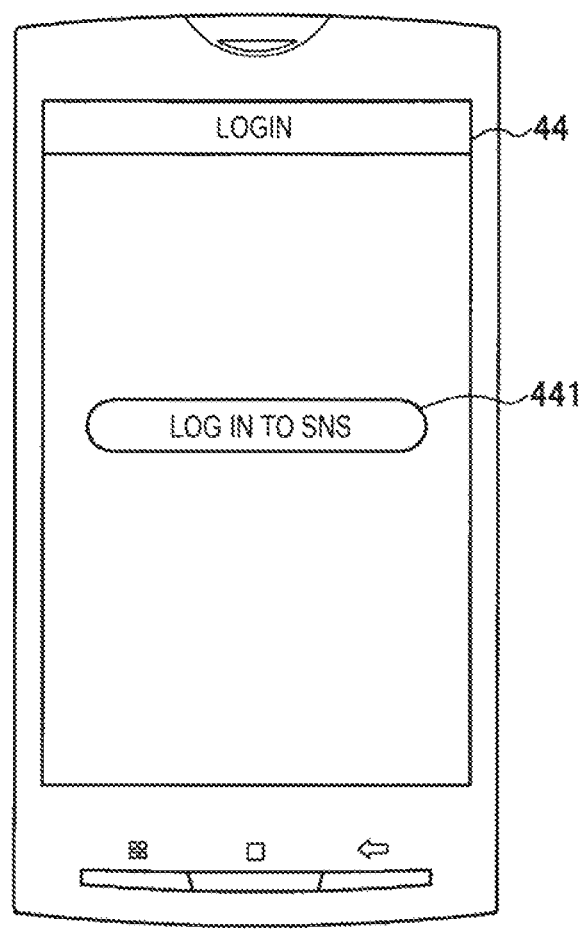
FIG. 8 is a diagram showing an example of a login screen.

FIG. 8 is a diagram showing an example of a login screen 44. The login screen 44 includes a login button 441 for performing login to a predetermined SNS. When the login button 441 is tapped, login to the communication system is performed via a browser of the predetermined SNS, and the display screen of the client 10 transitions to a registration screen to be described next with reference to FIG. 9.

(Registration of a User Profile)

Figure 9:
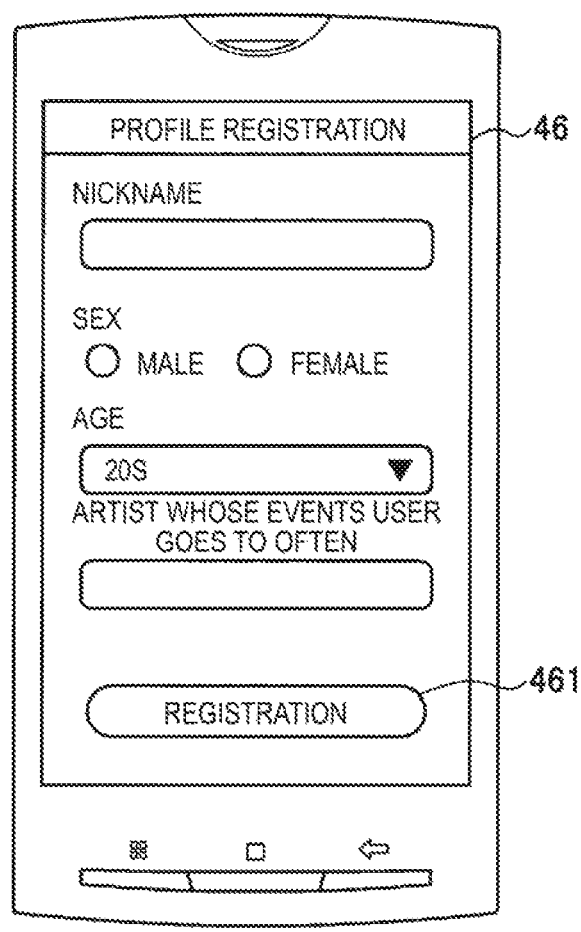
FIG. 9 is a diagram showing an example of a registration screen.

FIG. 9 is a diagram showing an example of a registration screen 46. The registration screen 46 is a screen for inputting a profile to be shared for all events. An input user profile includes, for example, a nickname, age and sex, the name of an artist whose events the user goes to often (which can be autocompleted through a predictive transform), the name of an artist whose events the user wants to go to, frequencies of attendance at events (how many times the user joins events a year), a profile image, and the like. Furthermore, when a registration button 461 included on the registration screen 46 is tapped, the display screen of the client 10 transitions to an event list screen to be described next with reference to FIG. 10. In addition, the client 10 transmits the input user profile (to be shared for all events) to the server 30.

The specific examples of the display screen at the time of the initial activation have been described above. Next, functions of respective menus items "event," "account," "talk," "activity," and "other" included in the tab displayed at the lower end of the display screen after activation will be described in order.

<4-2. Event>

First, examples of display screens with regard to the function of "event" will be described with reference to FIGS. 10 to 17.

(Event List)

Figure 10:
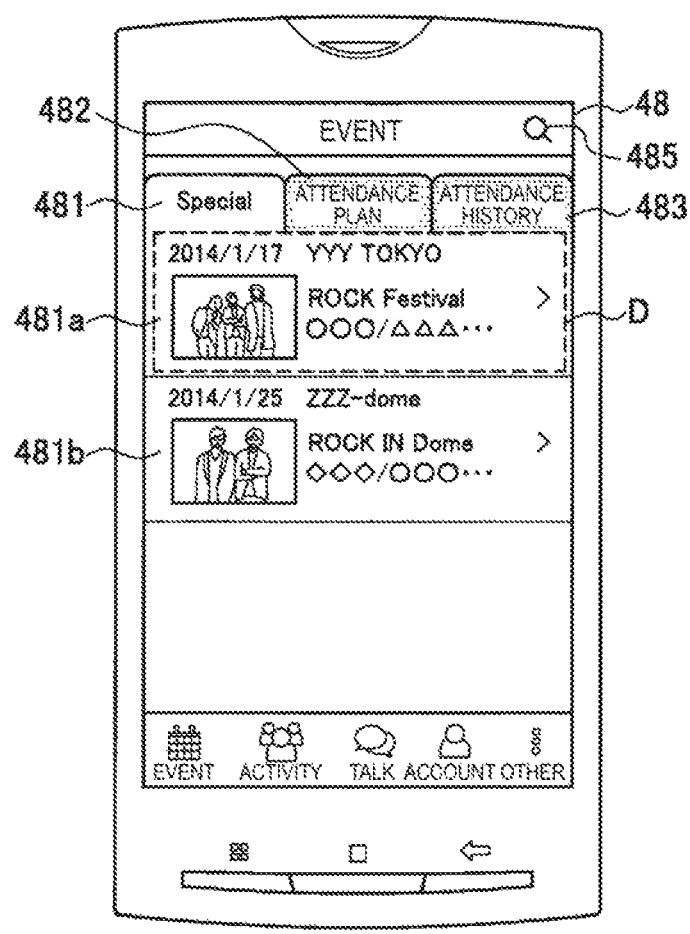
FIG. 10 is a diagram showing an example of an event list screen.

FIG. 10 is a diagram showing an example of an event list screen 48. The event list screen 48 is a screen for displaying a list of events relating to a user. More specifically, the event list screen 48 can be constituted by sub screens that are linked to each of a "Special" (events to be notified of) tab 481, an "Attendance plan" tab 482, and an "Attendance history" tab 483. In the example shown in FIG. 10, a special event list screen linked to the "Special" tab 481 is displayed as an example.

The special event list screen linked to the "Special" tab 481 shows a list of events of which uses of her event mates are notified of by a promoter to the user (that her event-mates are planning to attend). In the example shown in FIG. 10, for example, the special event list screen includes event information 481*a* and 481*b*. The event information 481*a* and 481*b* include the names of events, venues, dates, photos, featured artists, and the like.

Figure 13:
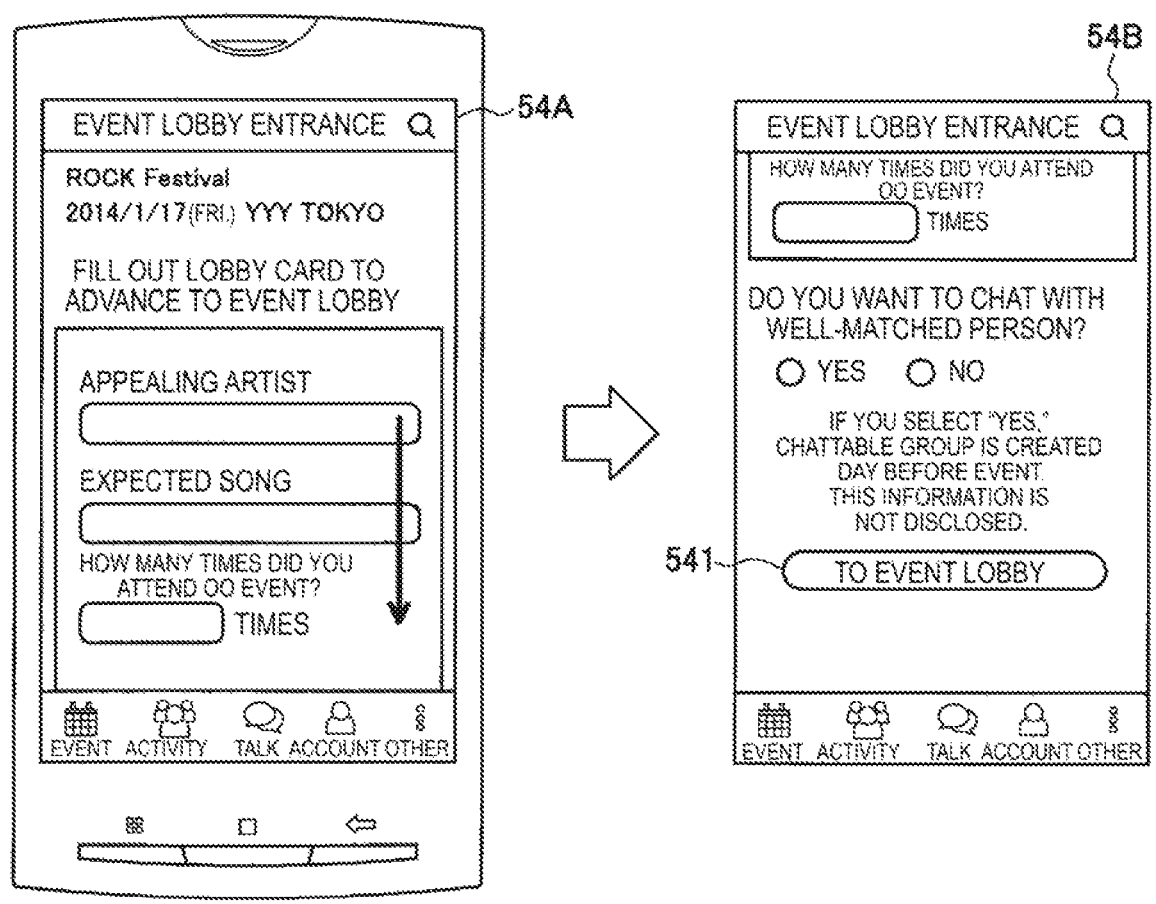
FIG. 13 is a diagram showing an example of an event lobby entrance screen.

When the "Attendance plan" tab 482 is selected, a plan-to-attend event list screen is displayed. The plan-to-attend event list screen is a screen for displaying a list of events that the user is planning to attend, i.e., that the user is interested in. Expression of interest in a specific event (an attendance plan) can be recognized by the server 30 when an event lobby card to be described below with reference to FIG. 13 is filled out. When the user fills out the event lobby card for a specific event, the server 30 recognizes that the user has expressed her interest in the specific event, causes the storage unit 34 to store the identification information of the user in association with the specific event, and adds information of the specific event in which the user has expressed her interest to the user's plan-to-attend event list screen.

When the "Attendance history" tab 483 is selected, an attendance history event list screen is displayed. The attendance history event list screen is a screen for displaying a list of events that the user attended in the past. The fact that the user has attended a specific event can be recognized through an operation of tapping, for example, performing an operation of tapping the "I'm attending this event" button 561 displayed on an event lobby screen 56 (see FIG. 14) that the user can access while the event is being held. Alternatively, when the fact that the user attended a specific event is to be registered later, it can be recognized by performing an operation of tapping a "Register in the attendance history" button (not shown in FIG. 12) displayed after closing of the event on the event details screen 52 shown in FIG. 12, rather than a "To the event lobby" button 521 displayed while the event is being held.

The information of the event is added to the attendance history event list screen linked to the "attendance history" tab 483 according to tapping of the "I'm attending this event" button 561 or tapping of the "Register in the attendance history" button. In addition, the client 10 transmits an attendance signal indicating that the user attended the event to the server 30 according to tapping of the "I'm attending this event" button 561 or tapping of the "Register in the attendance history" button.

In addition, an icon 485 displayed in a header part of the event list screen 48 is for executing event searches, and when the icon 485 is tapped, the display screen transitions to an event search screen 50 to be described next with reference to FIG. 11.

(Event Search)

Figure 11:
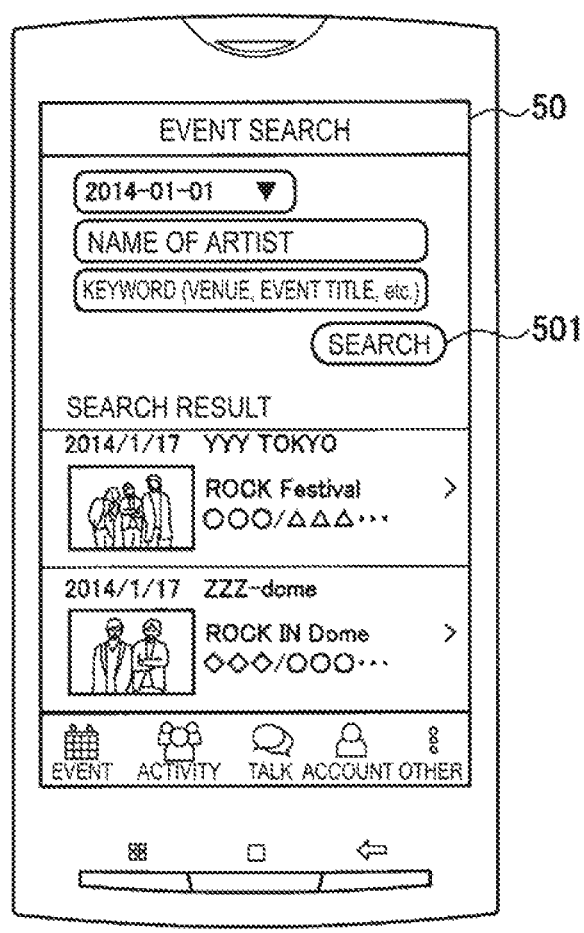
FIG. 11 is a diagram showing an example of an event search screen.

FIG. 11 is a diagram showing an example of the event search screen 50. The event search screen 50 is a screen for searching for past and future events. As a search condition, for example, at least any of dates, the name of an artist, and a keyword is designated on the event search screen 50, and when a search button 501 is tapped, a search application programming interface (API) is called out to execute an event search in the server 30. Note that candidates of the name of an artist may be set to automatically appear using a predictive transform each time a letter is input in the artist name input field.

Search results are displayed in the lower part of the event search screen 50 as shown in FIG. 11.

(Event Details)

Figure 12:
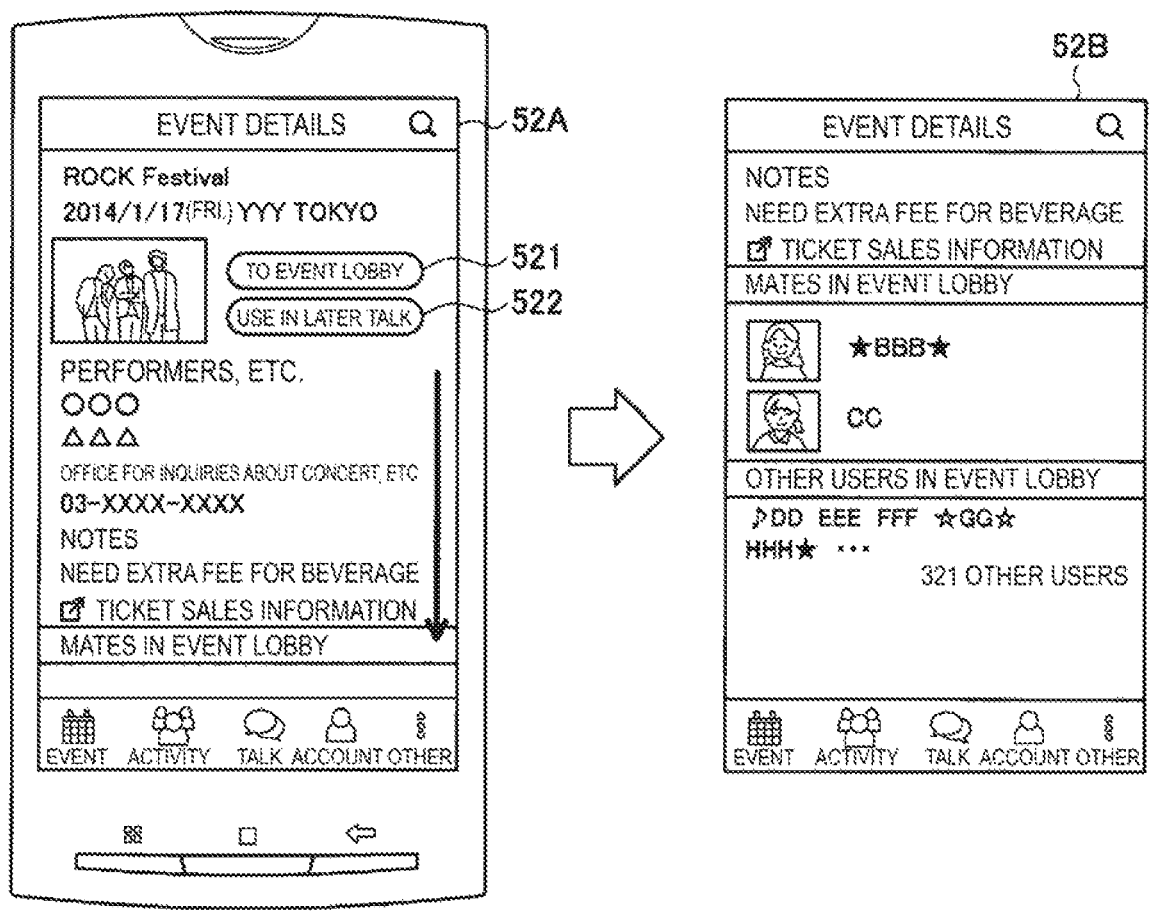
FIG. 12 is a diagram showing an example of an event details screen.

FIG. 12 is a diagram showing an example of the event details screen 52. The event details screen 52 is displayed when a display region of event information displayed on the event list screen or a search result is tapped, and displays detailed information of an event and relevant users. For example, when a display region D of the event information 481*a* included on the special event list screen shown in FIG. 10 is tapped, the display screen transitions to the event details screen 52 shown in FIG. 12.

The event details screen 52 is constituted by, for example, an event details screen 52A corresponding to an upper display region and an event details screen 52B corresponding to a lower display region as shown in FIG. 12, which are sequentially scrolled and displayed according to scroll operations on the display screen.

The event details screen 52 displays, as detailed information of an event, the name of an event, a date, a venue, an image, an artist who will attend the event (a performer, or the like), an inquiry office (for telephone numbers of the promoter, and the like, an e-mail address, a link to a web site, and the like), notes, and ticket sales information (a link to a ticket sales website, or the like).

Figure 15:
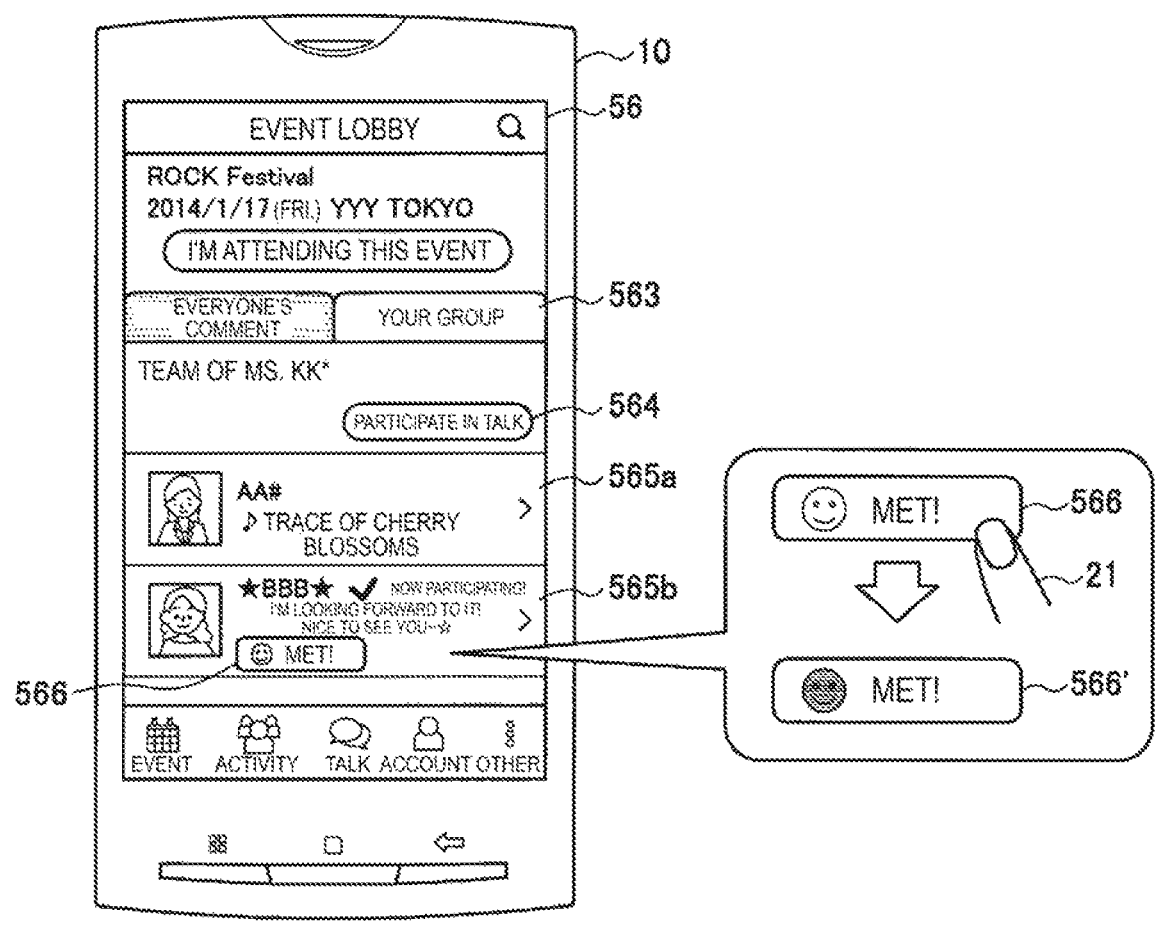
FIG. 15 is a diagram showing an example of an event lobby screen.

In addition, as information of users who are related to an event, users who are planning to attend the event are clarified. Specifically, "Mates in the event lobby" and "Other users in the event lobby" are displayed. In the "Mates in the event lobby," information of other users for whom "friend registration" (event-mate registration) to be described below with reference to FIG. 15 is already performed (their profile photos and nicknames) is displayed. In the "Other users in the event lobby," information (nicknames) of other users who are not registered as friends is displayed.

In addition, the event details screen 52 includes the "To the event lobby" button 521 for an event that is not yet held. When the "To the event lobby" button 521 is tapped, the display screen transitions to an event lobby entrance screen 54 to be described next with reference to FIG. 13. On the other hand, after the event is held, a "Register in the attendance history" button is included instead of the "To the event lobby" button 521 shown in FIG. 12.

In addition, the event details screen 52 includes a "Use in a later talk" button 522 as shown in FIG. 12. When the "Use in a later talk" button 522 is tapped, information of the event is included in a clipped event list to be described below with reference to FIG. 26.

(Event Lobby Entrance)

FIG. 13 is a diagram showing an example of the event lobby entrance screen 54. The event lobby entrance screen 54 is a screen for filling out an event lobby card necessary for entering (accessing) an event lobby. The event lobby card is filled out to express the fact that the user plans to attend (is interested in) the event before the target event is held, and filling out the event lobby card can be recognized by the server 30 as an interest signal indicating her interest in the event. After the event lobby card is filled out, the server 30 permits her entrance (access) to the event lobby. In addition, after the event lobby card is filled out, information of the user who fills out the card is displayed in a client 10 of another user in association with the event. Specifically, the information is displayed in, for example, the "Mates in the event lobby" or the "Other users in the event lobby" included in the event details screen 52B shown in FIG. 12 or displayed on the activity screen 73 shown in FIG. 28 to be described below of a display screen of the client of the other user.

Here, the event lobby entrance screen 54 shown in FIG. 13 is constituted by an event lobby entrance screen 54A corresponding to an upper display region and an event lobby entrance screen 54B corresponding to a lower display region, and is sequentially scrolled and displayed according to scroll operations on the display screen.

User information with respect to an event such as a self-introduction for social interactions with other users who are attending the same event (event-mate candidates) is input on the event lobby card. Specifically, for example, information such as how many people are going together (when the number is plural, it can be selected from a mate list shown in the event details screen 52B of FIG. 12), who is an appealing artist (when a plurality of artists will appear), what music is expected to be played, a degree of likeability of the appealing artist, and the number of times that the user attended the event is input. In addition, how one plans to enjoy the event (front row seats, in a comfortable manner, making friends, or the like), and a (freely describable) short comment to another user who attends the event can also be input. Furthermore, whether to use a group function can also be selected. When, for example, the question "Do you want to chat with a well-matched person?" shown in the event lobby entrance screen 54B shown in FIG. 13 is answered with "yes," it is recognized as an expression of the user's intention to use the group function.

In addition, when a "To the event lobby" button 541 included on the event lobby entrance screen 54B is tapped, filling out (registration) of an event lobby card is executed, and the display screen transitions to the event lobby screen 56. In addition, the client 10 transmits the input user profile (corresponding to the specific event) to the server 30.

(Event Lobby)

Figure 14:
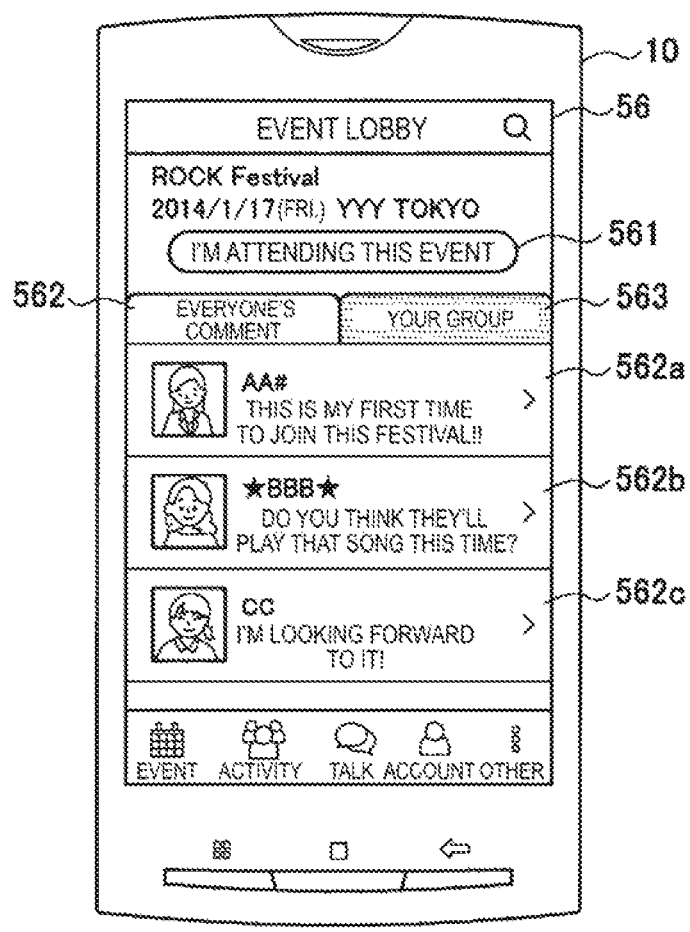
FIG. 14 is a diagram showing an example of an event lobby screen.

FIG. 14 is a diagram showing an example of the event lobby screen 56. The event lobby screen 56 is a screen for displaying information of respective users (users who plan to attend) related to attendance at the event, and can specifically be constituted by a display region showing an overview of the event and respective sub screens linked to an "Everyone's comment" tab 562 and a "Your group" tab 563 as shown in FIG. 14.

In the display region showing the overview of the event on the event lobby screen 56, the name, the date, the venue, and the like of the event are displayed. Note that, when display of such an overview of an event is tapped, the display screen may be set to transition to the event details screen 52 shown in FIG. 12.

Furthermore, the "I'm attending this event" button 561 for expressing the fact that the user is actually attending the event (button for attending) is displayed, and an attendance signal is transmitted from the client 10 to the server 30 when the user taps the "I'm attending this event" button 561 while the user is attending the event. According to the attendance signal, information of the event is added to, for example, the "Attendance history" tab 483 shown in FIG. 10. The "I'm attending this event" button 561 is description for the opening day of the event, and it may be changed to description such as "Visited this event" the day after the opening day of the event.

In addition, the sub screen linked to the "Everyone's comment" tab 562 is a planning-to-attend user list screen showing a list of users who filled out the event lobby card (who expressed their interest in or intention to attend the event). The planning-to-attend user list screen displays user information fields 562a to 562c in which nicknames of the users and short comments input when the event lobby card is filled out are reflected. Thereby, the user can see in advance other users who are planning to attend the event. Note that the planning-to-attend user list screen also includes information of the corresponding user (see the user information field 562a). In addition, an order of displaying information of the users on the planning-to-attend user list screen is sorted in an order of recommendation levels with respect to a viewing user based on a predetermined criterion. For example, the users may be sorted in an order of users having similar interests or preferences presumed based on profile information of the common users for all events (see FIG. 9) and profile information corresponding to a specific event (see FIG. 13).

When a user information field 562 included on the planning-to-attend user list screen is tapped, a lobby card of the user is displayed. For example, when the user information field 562a of the corresponding user is tapped, the display screen transitions to a lobby card display screen 58 of the user to be described below with reference to FIG. 16. In addition, when the user information field 562b of another user is tapped, the display screen transitions to the lobby card display screen 59 of the other user to be described below with reference to FIG. 17.

In addition, the sub screen linked to the "Your group" tab 563 is a group member list screen showing a list of the users included in the group automatically formed by the group creating unit 31d of the server 30 for the event as shown in FIG. 15. The group creating unit 31d is constituted of users having similar profiles as described above. In addition, when the group is formed, a degree of interactions of respective users to be described below with reference to FIG. 17 can also be considered.

The group member list screen displays user information fields 565a to 565b in which profiles such as nicknames, short comments toward the group members, expected songs, and the like (information input in the lobby card) are reflected as information of the users included in the same group. The name of the group is automatically given by the server 30. In addition, since the group member list screen displays information of all the users included in the same group regardless of whether or not they actually attend the event, a check mark and a phrase "Now attending!" are presented for a user who has expressed the fact that she is attending the event as shown in FIG. 15.

Here, the "Your group" tab 563 may be set to be active after the beginning of the event (or a predetermined time before the opening of the event) and when a user has expressed her intention to use the group function while the user is filling out the event lobby card (see FIG. 13). In addition, when the "Your group" tab 563 is opened before creation of a group, the user who has selected "Yes" to "Do you want to chat with a well-matched person?" when filling out the lobby card may be given a notification such as "Your group will be created at 18:00 on January 16." On the other hand, a user who has selected "No" to the question receives a display "You have not joined the group. You must amend your card if you want to join the group," to prompt a transition to the lobby card display screen 58 of the corresponding user.

In addition, when the "Your group" tab 563 becomes active, text "Check people you met at the event" may be displayed.

The text "Check people you met at the event" is to prompt the user to tap a "Met" button 566 included in the user information field 565b of another user to register the other user as a friend (event-mate) when the user has actually met and talked with the other user of the group in the event venue. When the user taps the "Met" button 566 with her finger 21 or the like, an icon included in the "Met" button 566 changes (see a "Met" button 566'), which expresses the fact that tapping has been performed. When the "Met" button 566 is tapped, the client 10 transmits a signal indicating that the user met the other user to the server 30.

Note that, when a user information field 565 included on the group member list screen is tapped, the display screen transitions to a screen displaying the lobby card of the user (see FIGS. 16 and 17) like when a user information field 562 included on the planning-to-attend user list screen is tapped.

In addition, when a "Participate in a talk" button 564 included on the group member list screen as shown in FIG. 15 is tapped, the display screen transitions to a screen of a group talk to be described below with reference to FIG. 25 (mutual communication between members of the group via a network), and thus it is possible to participate in a group talk. Note that, before the transition to the screen of the group talk, text "Do you want to move to an event group talk?" is displayed, and when "No" is selected, the screen returns to the original screen shown in FIG. 15 and the "Participate in a talk" button 564 is grayed out, and when "Yes" is selected, the screen may transition to a group talk screen shown in FIG. 25. In addition, the "Participate in a talk" button 564 may be set to be active when the "I'm attending this event" button 561 is tapped and an attendance signal is transmitted to the server 30.

(Lobby Card)

Figure 16:
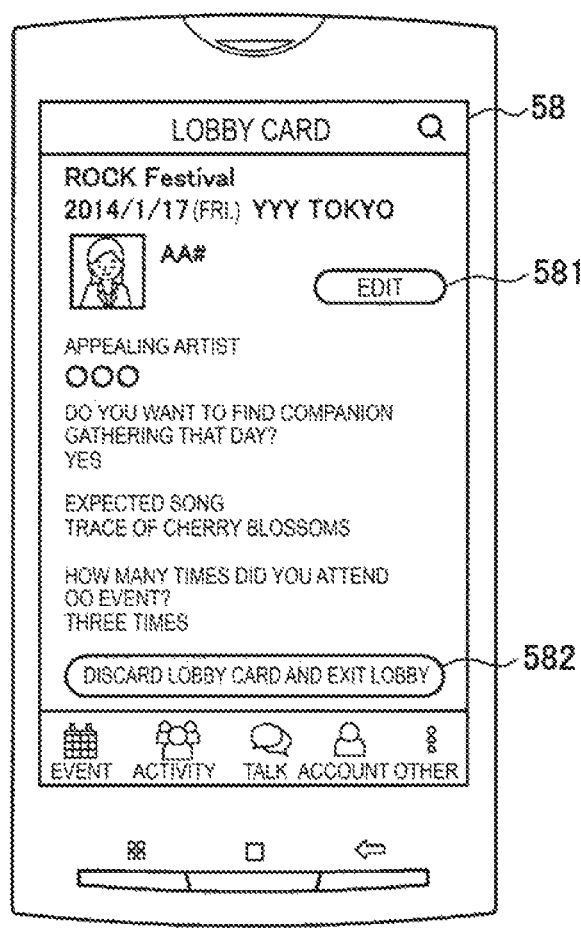
FIG. 16 is a diagram showing an example of a lobby card display screen of a user.

FIG. 16 is a diagram showing an example of the lobby card display screen 58 of the user. The lobby card display screen 58 is a screen that displays the lobby card that is filled out based on information input on the screen shown in FIG. 13 and expresses the stance of the user on an event that the user plans to attend or has attended in the past.

The lobby card display screen 58 includes display of the information input on the screen shown in FIG. 13 and an edit button 581, and a lobby card discard button 582. When the edit button 581 is tapped, the screen transitions to a screen for amending the content of the lobby card, and then the content (registered content) of the lobby card can be edited. In addition, when the lobby card discard button 582 is tapped, the user exits the event lobby and returns to the event details screen 52 shown in FIG. 12, and the content (registered content) of the lobby card is erased. Note that the lobby card discard button 582 may be displayed along with a note "Please press this button to exit the lobby if you will no longer be attending the event."

Figure 17:
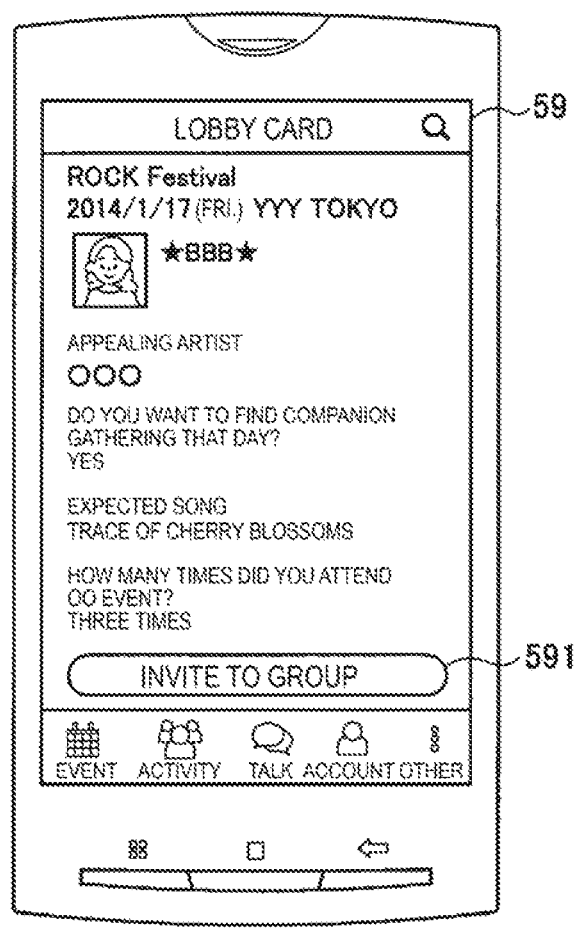
FIG. 17 is a diagram showing an example of a lobby card display screen of another user.

FIG. 17 is a diagram showing an example of a lobby card display screen 59 of another user. The lobby card display screen 59 is a screen that displays a lobby card that is filled out by the other user and expresses the stance of the other user on an event that the other user plans to attend or has attended in the past.

In addition, the lobby card display screen 59 includes an "Invite to the group" button 591. The "Invite to the group" button 591 is for notifying the server 30 of a member that the user wants to invite to the same group, and the group creating unit 31d of the server 30 can also create a group further considering interactions among the users based on such notification from the client 10 of each user. Note that the partner user is not notified of the fact that the "Invite to the group" button 591 is tapped.

In addition, the "Invite to the group" button 591 is grayed out when the "Do you want to chat with a well-matched person?" is answered with "No" shown in the event lobby entrance screen 54B of FIG. 13. In this case, a phrase "You must amend your lobby card if you want to form a group with this person" is posted.

<4-3. Account>

Next, display screen examples with regard to an "account" function will be described with reference to FIGS. 18 to 21.

(Profile)

Figure 18:
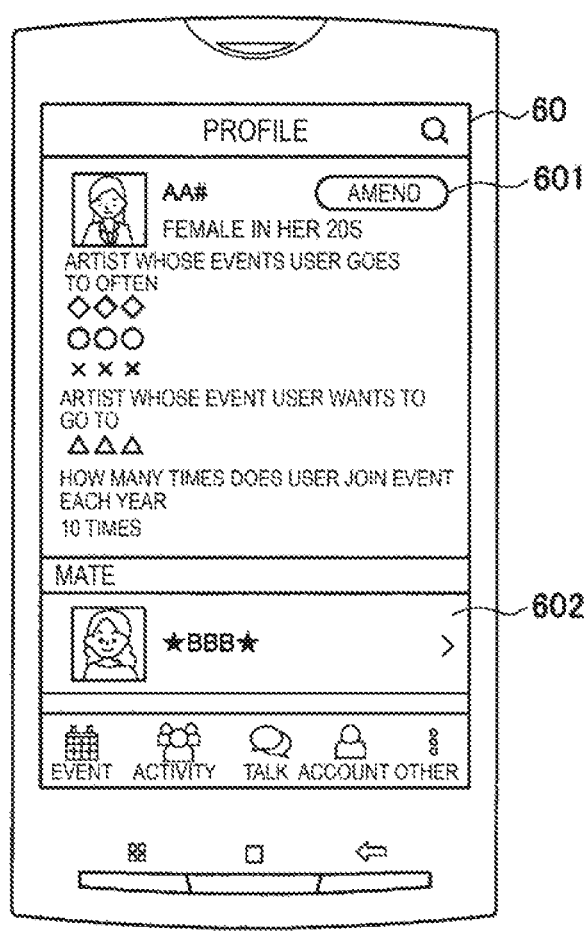
FIG. 18 is a diagram showing an example of a profile display screen of the user.

FIG. 18 is a diagram showing an example of a profile display screen 60 of the user. The profile display screen 60 includes information input on the registration screen 46 of the profile shown in FIG. 9 (profile information), information of an event-mate registered as a friend, information of a person that the user met at an event, and the ID (numbers or a sequence of characters) of the user herself to be used for user searches. An event-mate registered as a friend is another user registered by the registration processing unit 31e of the server 30 when both users tap the "Met" button 566 (see FIG. 15). In addition, a person whom the user met at an event is another user for whom friend registration is not performed because the user unilaterally taps the "Met" button 566 (see FIG. 15).

Furthermore, the profile display screen 60 includes an amendment button 601 for amending profile information.

In addition, when a mate information field 602 of the profile display screen 60 is tapped, the screen transitions to a profile display screen 61 of the mate (the other user) to be described next with reference to FIG. 19.

Figure 19:
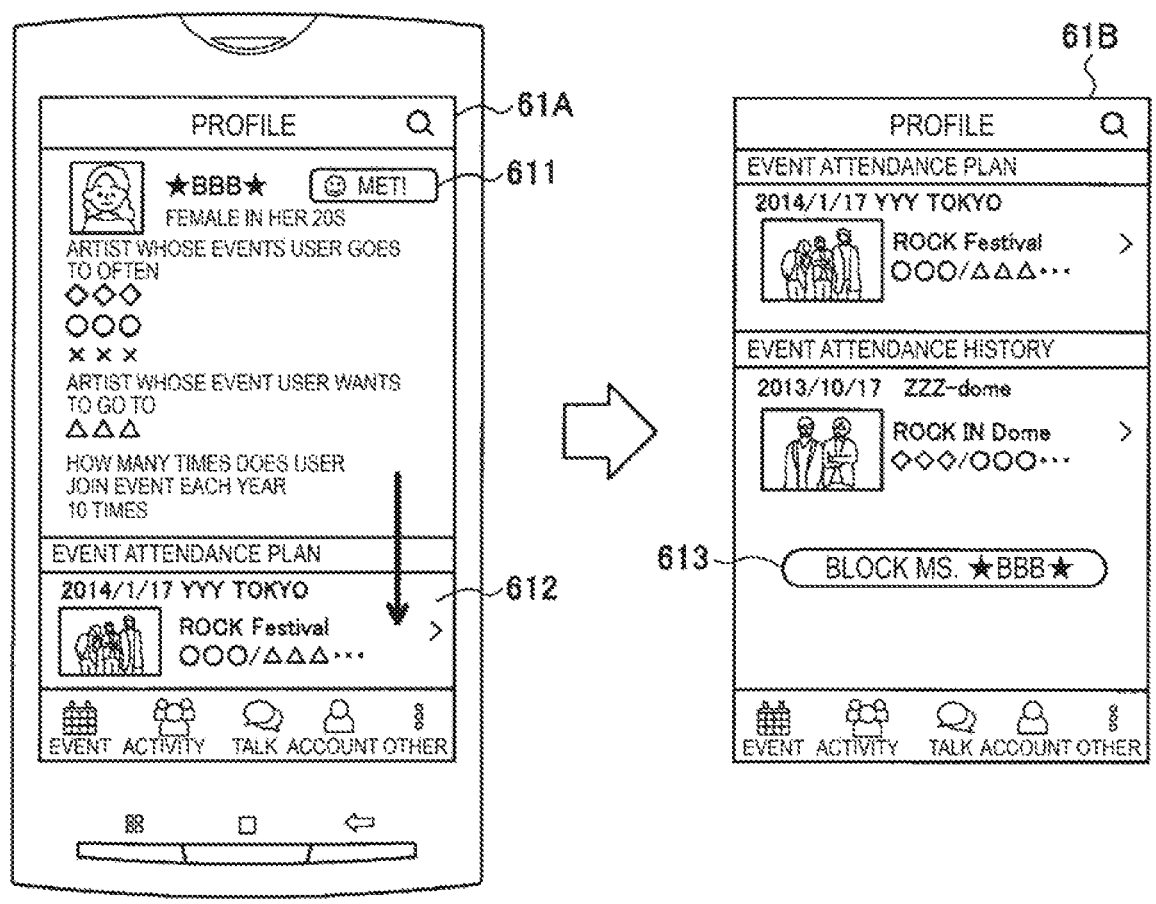
FIG. 19 is a diagram showing an example of a profile display screen of the other user.

FIG. 19 is a diagram showing an example of the profile display screen 61 of the other user. The profile display screen 61 includes information input by the other user on a profile registration screen (profile information), a list of events that the other user plans to attend, and a list of events that the other user has attended (attendance history). An event that the other user plans to attend is an event for which the other user filled out a lobby card. In addition, an event that the other user has attended is an event for which a signal indicating attendance of the other user has been transmitted. Note that a user is not allowed to read a lobby card of another user for each event from the profile display screen 61, but the user can read it when the user has also filled out a lobby card of a target event and entered its lobby.

The profile display screen 61 of the other user shown in FIG. 19 is constituted by a profile display screen 61A corresponding to an upper display region and a profile display screen 61B corresponding to a lower display region, which are sequentially scrolled and displayed according to scroll operations with respect to a display screen.

In addition, when an event information field 612 included on the list is tapped, the screen transitions to the event details screen (see FIG. 12). In addition, a check mark and a phrase "Plan to attend/have attended" can be displayed in the event information field of an event that the user also plans to attend or has attended.

In addition, the profile display screen 61 of the other user shown in FIG. 19 can be transitioned also based on a result of a user search to be described below with reference to FIG. 21. Thus, the profile display screen 61 of another user for which the user does not tap the "Met" button 566 can also be displayed. Here, the profile display screen 61 of the other user includes a "Met" button 611 as shown in FIG. 19, and if the "Met" button 611 is tapped after the closing of the event, a signal indicating that the user met the other target user can also be transmitted to the server 30.

In addition, the profile display screen 61 of the other user includes a block button 613 for preventing a talk with the other user and display of information of the other user.

(Amendment of a Profile)

Figure 20:
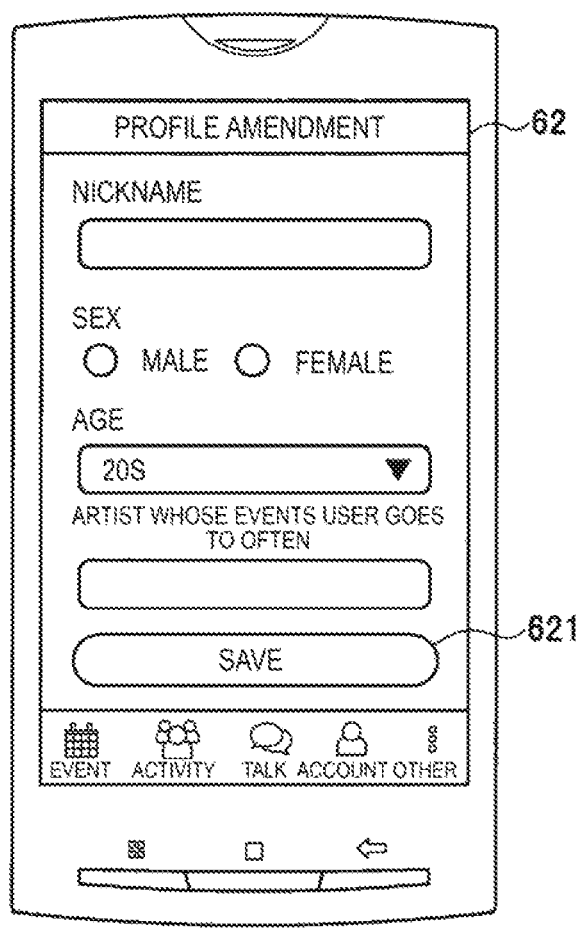
FIG. 20 is a diagram showing an example of a profile amendment screen for amending the profile of the user.

FIG. 20 is a diagram showing an example of a profile amendment screen 62 for amending the profile of the user. The profile amendment screen 62 is displayed when the amendment button 601 included on the profile display screen 60 of the user shown in FIG. 18 is tapped. The user can change her nickname, age and sex, an artist whose events the user goes to often, an artist whose event the user wants to go to, a frequency of attending an event, a profile image, and the like on the profile amendment screen 62.
(User Search)

Figure 21:
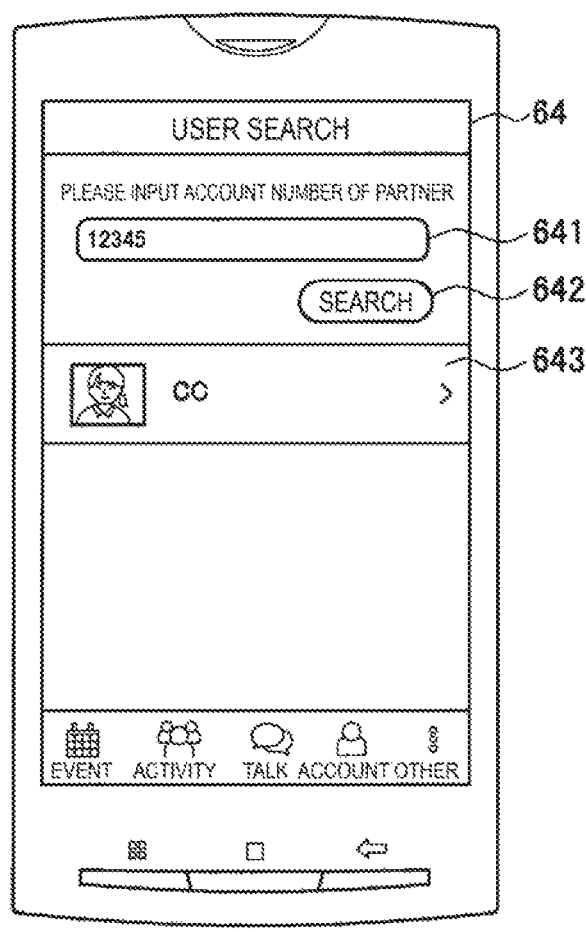
FIG. 21 is a diagram showing an example of a user search screen for performing a user search.

FIG. 21 is a diagram showing an example of a user search screen 64 for performing a user search. The user search screen 64 includes an ID input field 641 and a search button 642. When an input of an ID is received through the ID input field 641 and the search button 642 is tapped, the client 10 makes a search request with respect to the server 30. The server 30 searches for the user linked to the ID, and replies to the client 10 with a search result. Then, the client 10 displays the search result on the user search screen 64. When another user information field 643 displayed as the search result is tapped, the screen transitions to the profile display screen 61 of the other user shown in FIG. 19.

An ID (an account number) is, for example, a sequence of letters and numbers assigned at random at the time of an initial login. On the premise that another user has told the user their ID, the user can search for the other user whom the user wants to register as a friend (a friend that she already knows in real life, a person whom the user has gotten to know at an event venue regardless of a group, or the like) using the user search screen 64.

<4-4. Talk>

Next, display screen examples with regard to a "talk" function will be described with reference to FIGS. 22 to 27.
(List of Talks)

Figure 22:
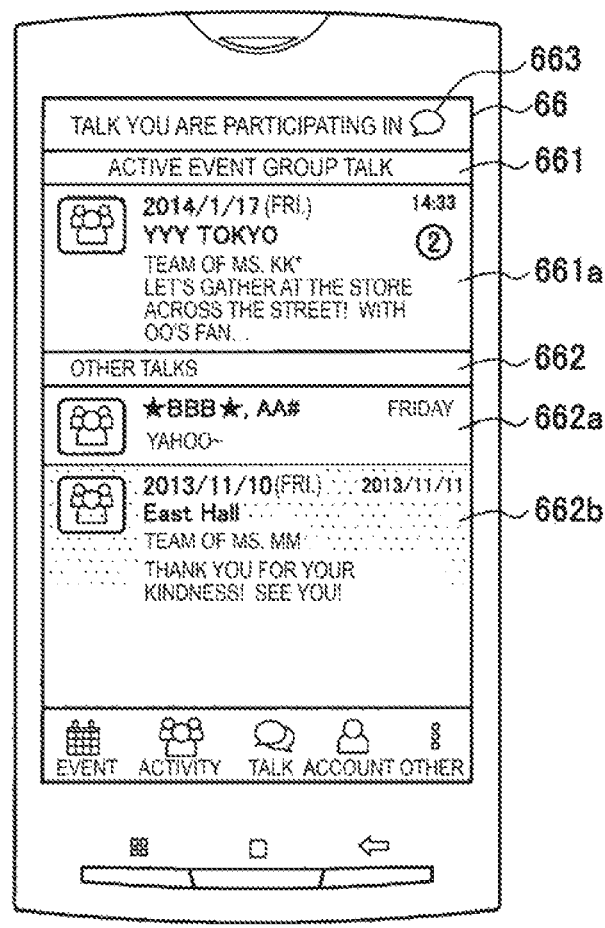
FIG. 22 is a diagram showing an example of a talk list screen of talks in which a user is participating.

FIG. 22 is a diagram showing an example of a talk list screen 66 of talks in which the user is participating. The talk list screen 66 is a screen for displaying a list of various talks (such as threads). The talk list screen 66 includes an "Active event group talk" screen 661 that displays a group talk information field 661a of a group that the user has joined, and an "Other talks" screen 662 that displays a talk-with-mate information field 662a and a frozen group talk information field 662b.

The group talk information fields 661a and 662b of groups created to correspond to events include information, for example, the dates and the venues of the events, the names of the groups, a part of the content of the latest writing, the time of the latest writing, the number of unread pieces of writing, and the like. The talk-with-mate information field 662a includes information, for example, the name of the member, a part of the content of the latest writing, the time of the latest writing, the number of unread pieces of writing, and the like.

In addition, event group talks and talks with mates are mixed on the "Other talks" screen 662, and talks are sequentially displayed in order of new writing.

In addition, a talk of a group created for an event is time-limited, and is controlled by the server 30 to be active from a predetermined time before an opening of the event to a predetermined time after the closing of the event. For this reason, after the predetermined time from the closing of the event, the group talk of the target event is frozen, and the screen moves from the "Active event group talk" screen 661 to the "Other talks" screen 662. On the "Other talks" screen 662, the color of the frozen group talk information field 662b changes to a color different from that of other talks (specifically, to an inconspicuous color). In addition, the content of the frozen event group talk can be read, but writing is not possible.

Figure 23:
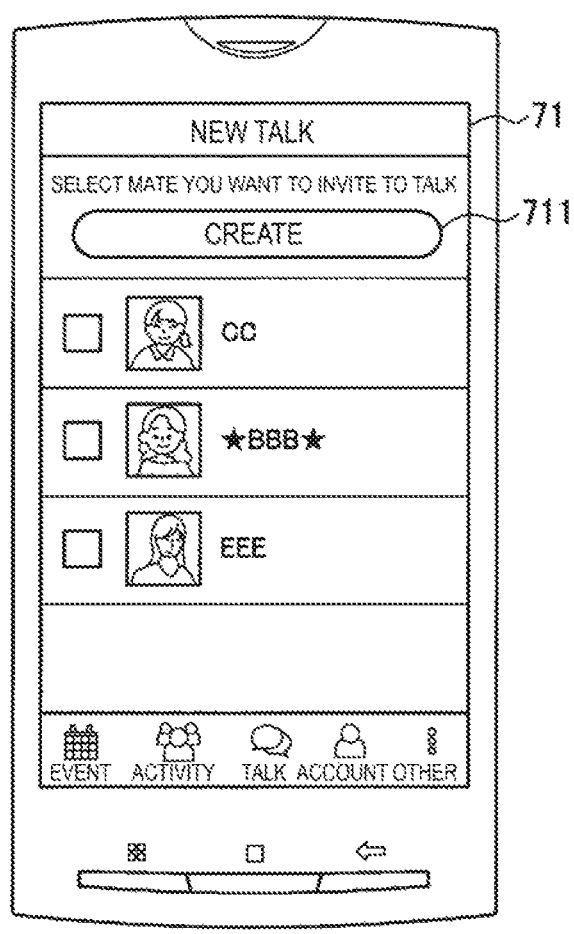
FIG. 23 is a diagram showing an example of a new talk creation screen.
Figure 24:
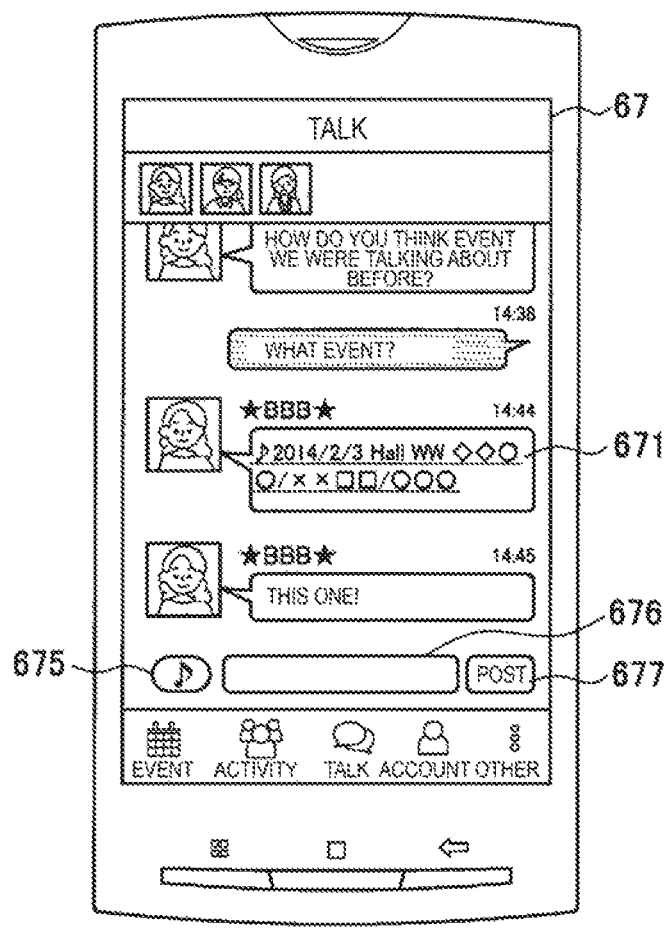
FIG. 24 is a diagram showing an example of a mate talk screen on which a talk with event-mates is performed.
Figure 25:
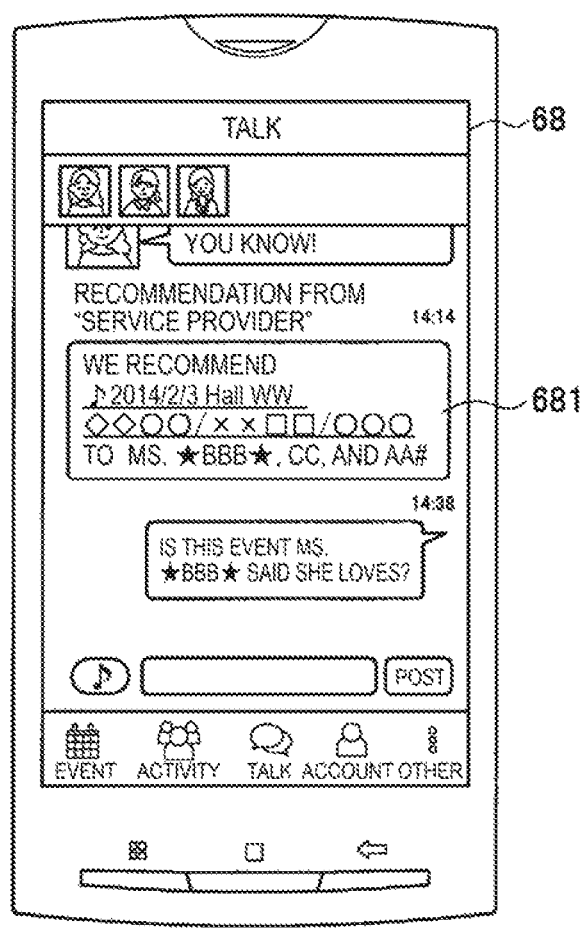
FIG. 25 is a diagram showing a case in which an advertisement is inserted on the mate talk screen on which the talk with the event mate is performed.

Furthermore, when a talk information field (specifically, for example, the group talk information fields 661a and 662b or the talk-with-mate information field 662a) is tapped, the screen transitions to a screen of each talk as shown next in FIGS. 23 to 25.

In addition, when a text bubble icon displayed in a header part of the talk list screen 66 is tapped, the screen transitions to a new talk creation screen 71 as shown in FIG. 23. The new talk creation screen 23 is a screen for selecting mates and creating a new talk. The new talk creation screen 23 displays a list of mates, and profile images and names (nicknames) of the mates are displayed on the list of mates. When a check box of any mate is checked and a creation button 711 is tapped, an empty mate talk screen is displayed if there is no overlapping talk in which the same selected mates are participating. When there already is an overlapping talk, a screen of the existing mate talk is displayed.
(Mate Talk)

FIG. 24 is a diagram showing an example of a mate talk screen 67 on which a talk with event-mates is performed. The mate talk screen 67 is a screen for users who are registered as friends to read and write threads on the condition that a signal indicating that they have met each other is transmitted. Individual threads can be created according to combinations of mates, and creating another thread in a combination of the same mates may be set not to be allowed.

In addition, the mate talk screen 67 includes a header, a participating member remark display region, and a text input region. The header temporarily displays participating members (for example, profile images of participating members) when the screen has transitioned to the mate talk screen 67. The display of the participating members disappears after a moment, but may be set to be displayed again when the participating member remark display region is scrolled to its upper end.

Remarks of respective participating members are displayed in the participating member remark display region in a chronological manner. The remarks of the respective participating members are displayed along with, for example, profile images, names, and times of remarks of the members. In addition, a remark of the corresponding user may be displayed in a different color from remarks of other users. In addition, when the participating member remark display region is scrolled to its upper end, a "Read an earlier talk" button may be displayed at a lower end of the header. When the "Read an earlier talk" button is tapped, a talk from farther back is acquired.

In addition, event information 671 inserted by a member can also be displayed in the participating member remark display region. Each member can select any event information from event information that she has clipped (see FIG. 26) and insert the information into a group talk.

In addition, event information 681 (an advertisement) recommended by the group by a provider of the communication system or a promoter of the event can also be displayed in the participating member remark display region as shown in FIG. 25. The recommended event information 681 is information of an event in which at least one user among the participating members is presumed to be interested or likely to be interested based on, for example, the profile of the user. By presenting information of an event in which at least one person is presumed to have expressed her interest to a plurality of connected members, effectiveness of an advertisement can be further enhanced. The control unit 31 of the server 30 performs display control of advertisement information on the mate talk screen 68.

Each piece of the event information 671 and 681 is attached with a link to a details screen of the event information (see FIG. 12) along with a predetermined mark indicating the type of the event. For example, the event information 671 has a musical note mark indicating that it is for a music event, and it is underlined to indicate that it is linked to an event details screen.

In addition, when a profile image or the name (nickname) of a participating member displayed on the mate talk screen 67 or 68 is tapped, the screen transitions to the profile display screen (see FIG. 19) of the participating member. In addition, when the inserted event information 671 or 681 is tapped, the screen transitions to the details screen of the event information (see FIG. 12).

Furthermore, the text input region displayed in a lower part of the mate talk screen 67 includes a musical note mark button 675 for calling out clipped event information, an input field 676 to which writing content is input, and a posting button 677 for executing writing on the mate talk screen 67.

Figure 26:
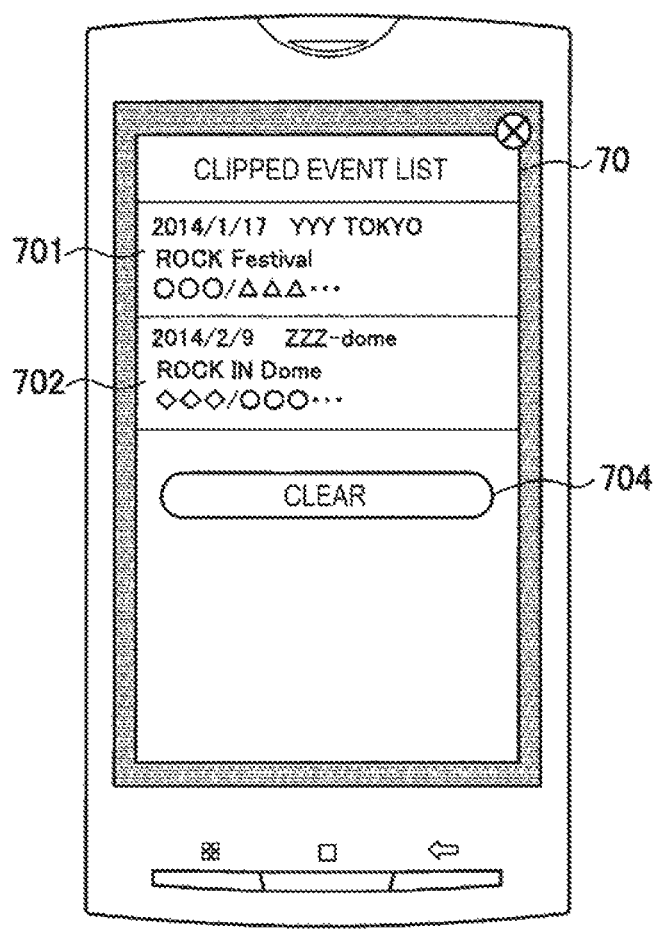
FIG. 26 is a diagram showing an example of a clipped event list screen.

When the posting button 677 is tapped, the content input into the input field 676 is posted on the mate talk screen 67. When the musical note mark button 675 is tapped, a clipped event list screen 70 shown in FIG. 26 is displayed, and thus event information to be inserted onto the mate talk screen 67 can be selected.

The clipped event list screen 70 shows a list of the clipped events when the "Use in a later talk" button 522 of the event details screen 52 shown in FIG. 12 is tapped. When an event desired to be inserted into a talk is tapped from the list of the events displayed on the event list screen 70, the screen transitions to a screen of the talk into which the event information is inserted. In addition, when a clear button 704 is tapped, the list is erased.

(Group Talk)

Figure 27:
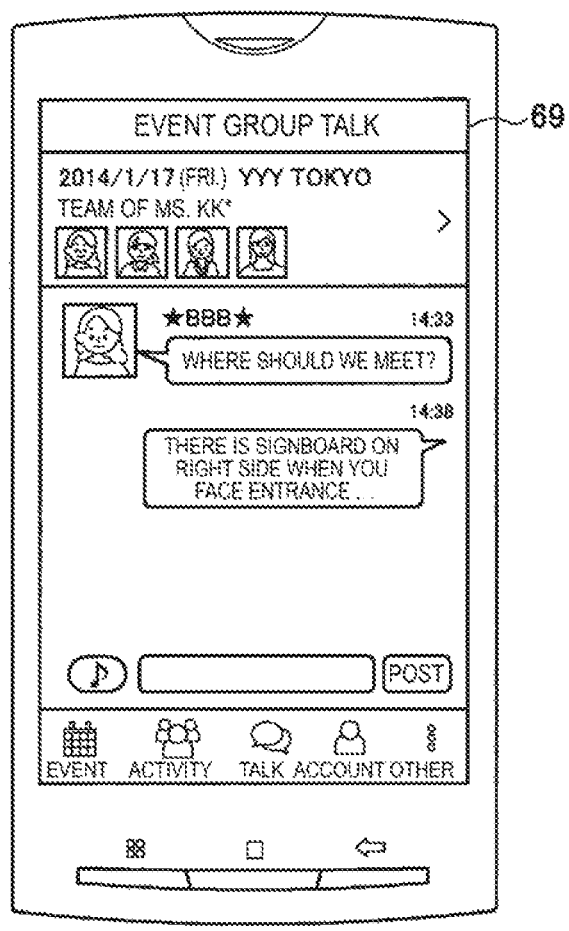
FIG. 27 is a diagram showing an example of a group talk screen on which members of a group created for a specific event talk.

FIG. 27 is a diagram showing an example of a group talk screen 69 in which the members of the group created for a specific event talk. The group talk screen 69 can be set such that writing is possible thereon from a predetermined time before the opening of the specific event to a predetermined time after the closing thereof, the talk is frozen thereafter, and only reading is possible.

The group talk screen 69 includes a header, a group member remark display region, and a text input region. The header includes the date, the venue, and the title of the event, and the group name, and profile images of the members. In addition, the text input region is not displayed after the group talk is frozen, and instead, a note "Writing is not possible for closed talks" is displayed.

Note that insertion of clipped event information or notification of event information (an advertisement) recommended by a system provider or a promoter of the event can be performed on the group talk screen 69 as well, like on the mate talk screens 67 and 68.

<4-5. Activity>

Next, display screen examples with regard to an "activity" function will be described with reference to FIGS. 28 and 29.

Figure 28:
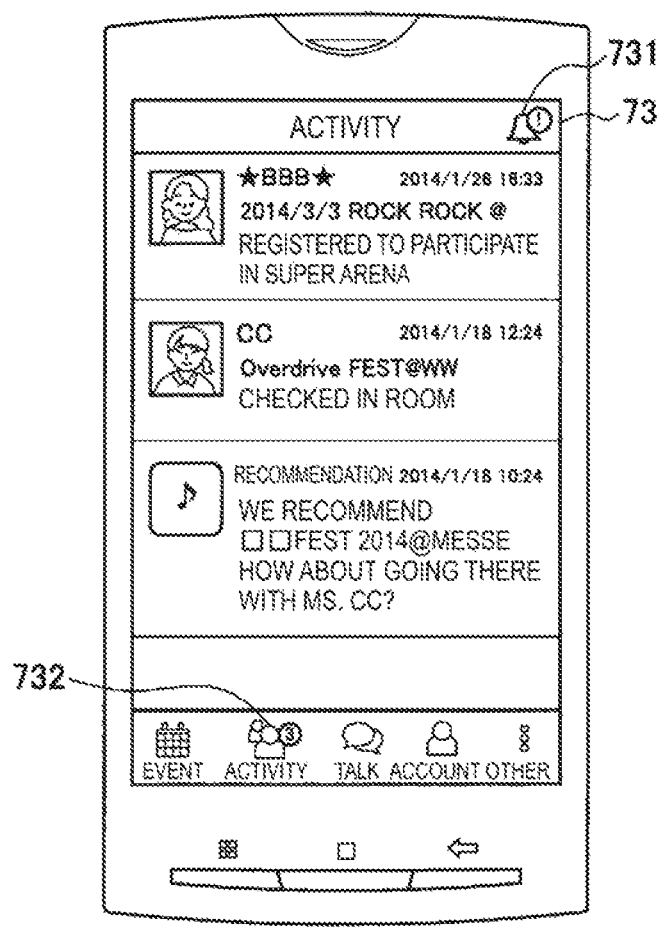
FIG. 28 is a diagram showing an example of an activity screen.

FIG. 28 is a diagram showing an example of the activity screen 73. The activity screen 73 displays activities of mates, or notifications of events recommended from a provider of the system or promoters of the events in chronological order (a time-descending order). Display of each notification can be realized with a subset of push notifications.

Activities of a mate include, for example, registration of a plan of the mate to attend an event (filling out of a lobby card), check-in of the mate at an event (attending an event), writing for a talk, and the like. When notification of event attendance plan registration of a mate or notification of event check-in of a mate is tapped, a lobby card of the mate (see FIG. 17) is displayed when the user has filled out the lobby card of a target event, and the event lobby entrance screen 54 (see FIG. 13) is displayed when she has not filled out the card. In addition, when notification of writing for a talk is tapped, the screen transitions to a talk screen (FIG. 24, 25, or 27).

In addition, in event notice, not only a suggestion only to the user but also a suggestion for attending an event together with a selected mate is also provided. When event notice for a suggestion only to the user is tapped, the screen transitions to the event details screen 52 (see FIG. 12), and when event notice for a suggestion for attending an event together with a selected mate is tapped, the screen transitions to a screen on which event information is inserted into a mate talk screen.

The header of the activity screen 73 displays a notice icon 731 for transitioning to a notice screen. When the notice icon 731 is tapped, the screen transitions to the notice screen 75 shown next in FIG. 29. In addition, when there are one or more notices that have newly arrived, an exclamation badge is attached to the notice icon 731.

In addition, an exclamation badge may be attached to an "activity" icon 732 included in the tab displayed at the lower end of the display screen when there is only one notice that has newly arrived, a badge indicating the number of unread notifications may be attached when there are only activity notifications that have newly arrived, and a badge indicating the number of unread activity notifications that have newly arrived may be attached when there are both. When there is a notification of writing for a talk, a badge indicating the number of pieces of writing that have newly arrived may be attached to a "talk" icon included in the tab displayed at the lower end of the display screen.

Figure 29:
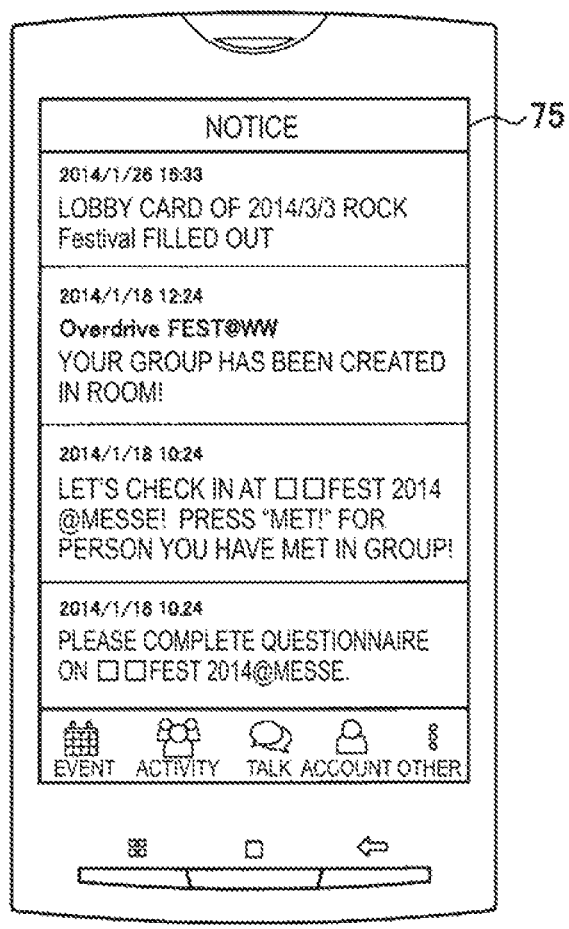
FIG. 29 is a diagram showing an example of a notice screen.

FIG. 29 is a diagram showing an example of the notice screen 75. The notice screen 75 displays various notifications that concern the user in chronological order (a time-descending order). Display of each notification can be realized with a subset of push notifications.

For example, filling out of a lobby card by the user, information of an event for which the user registered (filled out a lobby card) herself, a link to a web questionnaire, and the like are assumed as content of notifications. The information of an event for which the user registered herself includes, for example, the facts that another user has filled out a lobby card for the event, a group has been created, another user has joined the group, and the like.

In addition, when it is a predetermined time before an opening of a registered event, a notification prompting the user to tap the "I'm attending this event" button 561 shown in FIG. 14 may be given with a notification "Let's attend the event and keep a record!" In addition, when it is a predetermined time after the closing of the event, a notification prompting the user to tap the "Met" buttons 566 and 611 shown in FIGS. 15 and 19 may be given with a notification "Let's record the people you met!"

<4-6. Other>

Finally, display screen examples with regard to the "other" function will be described with reference to FIGS. 30 to 33.

Figure 30:
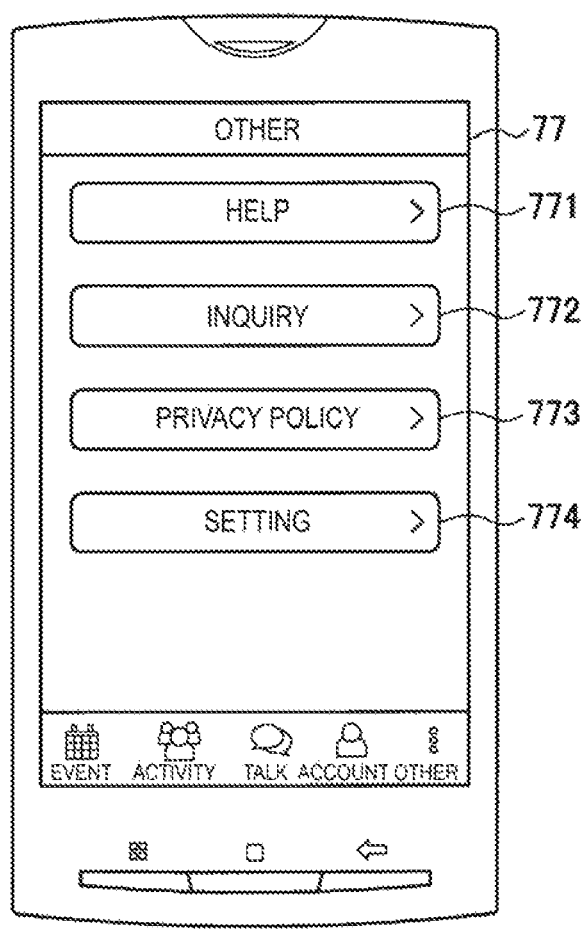
FIG. 30 is a diagram showing an example of an other function menu screen.

FIG. 30 is a diagram showing an example of an other function menu screen 77. The menu screen 77 includes, as the other function, a help button 771 for transitioning to a help screen 79, an inquiry button 772 for transitioning to an inquiry screen 81, a privacy policy button 773 for transitioning to a privacy policy display screen, and a setting button 774 for transitioning to a setting screen 83. When a button of the menu that the user wants to read is tapped, the screen transitions to the corresponding screen.
(Help Screen)

Figure 31:
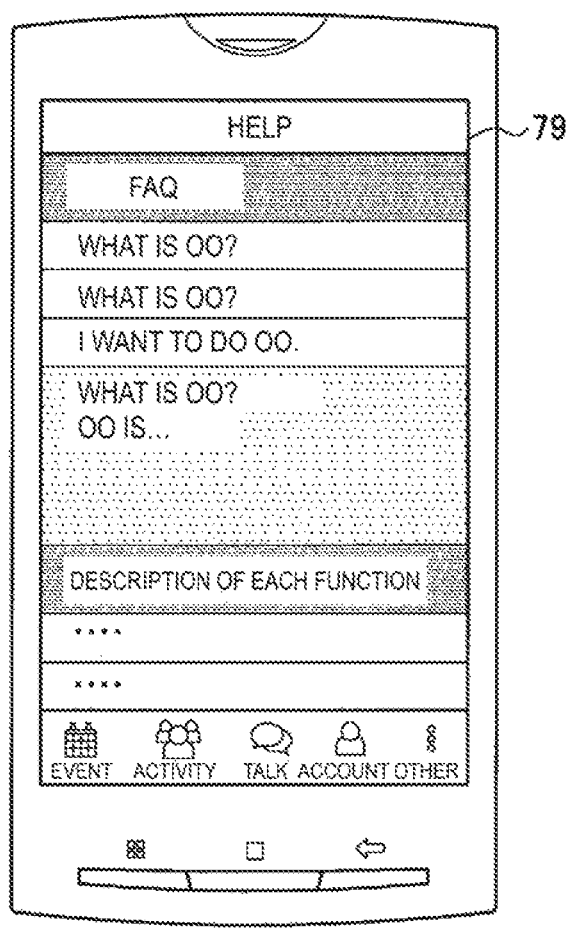
FIG. 31 is a diagram showing an example of a help screen.

FIG. 31 is a diagram showing an example of the help screen 79. The help screen 79 describes a method for using the present application. For example, index entries, sub items, and the content thereof are displayed. The content of each item may be displayed with an accordion UI. The displayed content includes a list of "frequently asked questions (FAQ)," or simple description of the content of the respective menus items of the tab (event, activity, talk, and account).

(Inquiry Screen)

Figure 32:
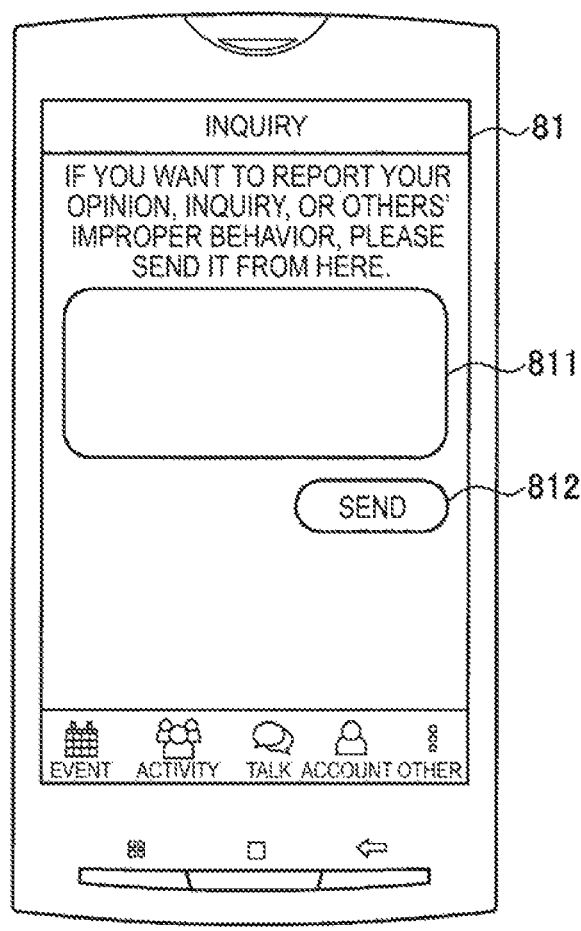
FIG. 32 is a diagram showing an example of an inquiry screen.

FIG. 32 is a diagram showing an example of the inquiry screen 81. The inquiry screen 81 is a screen for submitting inquiries, opinions, reports, and the like to the present communication system. The inquiry screen 81 includes an information input field 811 and a transmission button 812. When the transmission button 812 is tapped, text information input into the information input field 811 is transmitted to the server 30, and a screen including a phrase "Transmission successful" is displayed.

(Privacy Policy Display Screen)

The privacy policy display screen (not illustrated) is a screen that displays description with regard to a privacy policy of the present communication system.

(Setting Screen)

Figure 33:
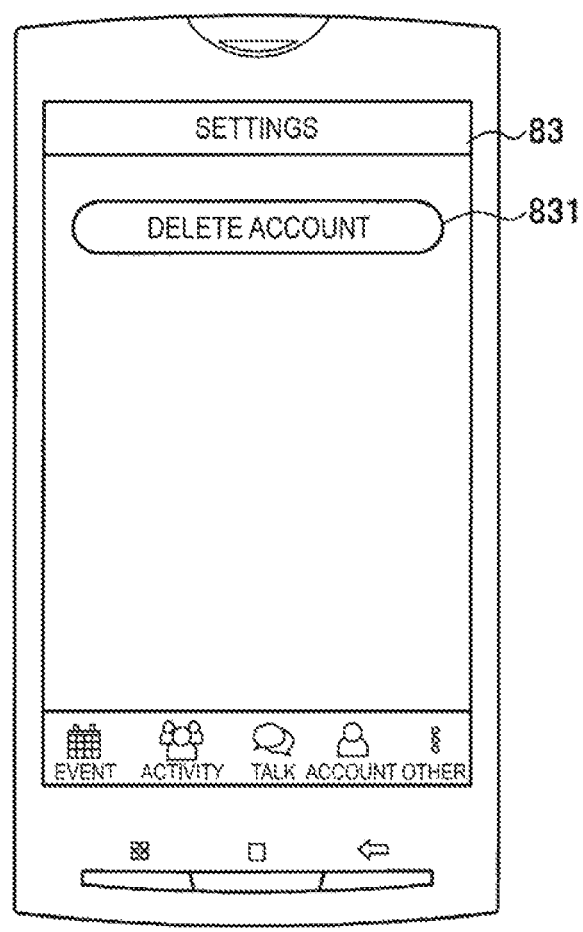
FIG. 33 is a diagram showing an example of a setting screen.

FIG. 33 is a diagram showing an example of the setting screen 83. The setting screen 83 includes an account deletion button 831. When the account deletion button 831 is tapped, the client 10 transmits an instruction to delete a user account for using the present communication system to the server 30, and then the server 30 performs a user account deletion process. After the deletion, the login screen 44 shown in FIG. 8, for example, is displayed. Registration can be performed again by tapping the login button 441 included on the login screen 44 for login.

<<5. Conclusion>>

In the event-specialized communication system according to the embodiment of the present disclosure, a group constituted of users of similar interests among a plurality of users expressing their interest in a specific event can be created and social interactions between the users who attend the specific event can be further promoted as described above.

In addition, a place for a group talk between members of a group can be provided through mutual communication via a network in the present embodiment. Accordingly, the members can have social interactions within the created group in preparation for an opening of an event, and can easily get to know each other when they actually meet at the event.

In addition, in the present embodiment, users who are recognized to have actually attended an event and met each other in a real space can be registered as event-mates, and can be invited to other events that will be held in the future or can be provided with a place for a mate talk between the event-mates through mutual communication via a network.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, a ROM, and a RAM, which are embedded in the above described the client 10 or the server 30, to execute the functions of the client 10 or the server 30. Moreover, it may be possible to provide a computer-readable storage medium having the computer program stored therein.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A server including:

a communication unit configured to receive a profile of a user or an interest signal indicating interest in a specific event along with identification information of the user from a client;

an accumulation unit configured to accumulate the profile of the user in association with the identification information of the user; and a control unit configured to perform control
to cause the identification information of the user to be stored in the accumulation unit in association with the specific event according to the interest signal indicating interest in the specific event,
to search for a user having a profile similar to the received profile of the user based on the identification information of the user associated with the specific event and to automatically create a group constituted of users of similar interests,
and to transmit information of the created group to the client from the communication unit when it is a predetermined time before an opening of the specific event.

(2)

The server according to (1), wherein the communication unit receives an attendance signal indicating attendance at the specific event from a specific user via the client, and wherein, when the attendance signal is received, the control unit causes a history indicating the attendance of the specific user at the specific event to be stored in the accumulation unit.

(3)

The server according to (2), wherein the communication unit receives information indicating meeting of first and second users whose histories of attendance at the specific event are accumulated, and wherein, when the information indicating the meeting is received, the control unit causes information indicating that the first and the second users are friends to be registered in the accumulation unit.

(4)

The server according to any one of (1) to (3), wherein the control unit controls a client of each user to perform group talk communication between the users included in the created group via a network from a predetermined time before the opening of the specific event to a predetermined time after closing of the event.

(5)

The server according to (4), wherein the control unit controls event information recommended to the group to be inserted into a group talk screen that presents the content of the group talk communication.

(6)

The server according to any one of (1) to (5), wherein the control unit permits access to an event lobby screen that presents information of each user who plans to attend the specific event according to filling out of a lobby card into which information of the user with regard to the specific event is input.

(7)

The server according to (6), wherein the event lobby screen includes an attendance button for transmitting an attendance signal indicating that the user has attended the specific event from the client to the server.

(8)

The server according to (6) or (7), wherein the event lobby screen includes information of the group created by the control unit.

(9)

A client including:

a communication control unit configured to control a profile of a user or an interest signal indicating interest in a specific event to be transmitted from a communication unit to a server along with identification information of the user, wherein the communication unit receives information of a group which is automatically created by the server based on the identification information of the user associated with the specific event and constituted of users having profiles similar to the profile of the user a predetermined time before an opening of the specific event.

(10)

The client according to (9), wherein the communication control unit controls an attendance signal indicating that the user has attended the specific event to be transmitted to the server, and wherein a history indicating that the user attended the specific event is accumulated in the server according to the attendance signal.

(11)

The client according to (10), wherein the communication control unit controls information indicating that a first user whose history of attendance at the specific event is accumulated in the server met a second user to be transmitted to the server, and wherein the communication unit receives information indicating that the first and second users are friends from the server.

(12)

The client according to any one of (9) to (11), further including:

a display control unit configured to control the information of the group received from the server to be displayed on a display unit.

(13)

The client according to (12), wherein the display control unit controls a group talk screen for performing group talk communication between the users included in the created group via a network to be displayed.

(14)

The client according to (12) or (13), wherein the display control unit controls a filling out screen for filling out a lobby card into which user information with regard to the specific event is input and which is necessary for accessing an event lobby screen that presents information of each user who plans to attend the specific event to be displayed.

(15)

The client according to (14), wherein the event lobby screen includes an attendance button for transmitting an attendance signal indicating that the user has attended the specific event from the client to the server.

(16)

The client according to (14) or (15), wherein the event lobby screen includes a button for transmitting a signal indicating that the user met another user while the user was attending an event from the client to the server.

(17)

A control method including:

receiving, by a communication unit, a profile of a user or an interest signal indicating interest in a specific event along with identification information of the user from a client;

accumulating, in an accumulation unit, the profile of the user in association with the identification information of the user; and performing control to store the identification information of the user in the accumulation unit in association with the specific event according to the interest signal indicating interest in the specific event, to search for a user having a profile similar to the received profile of the user based on the identification information of the user associated with the specific event and automatically create a group constituted of users of similar interests, and to transmit information of the created group to the client from the communication unit when it is a predetermined time before an opening of the specific event.

(18)

A storage medium storing a program that causes a computer to function as:

a communication control unit configured to control a profile of a user or an interest signal indicating interest in a specific event to be transmitted from a communication unit to a server along with identification information of the user, wherein the communication unit receives information of a group which is automatically created by the server based on the identification information of the user associated with the specific event and constituted of users having profiles similar to the profile of the user a predetermined time before an opening of the specific event.

REFERENCE SIGNS LIST 2, 2A, 2B user
10, 10A, 10B client
11 control unit
11a display control unit
11b communication control unit
12 operation display unit
13 communication unit
14 storage unit
30 server
31 control unit
31a screen generation unit
31b communication control unit
31c storage control unit
31d group creating unit
31e registration processing unit
33 communication unit
34 storage unit
40 splash screen
42 instruction screen 44 login screen
46 registration screen
48 event list screen
50 event search screen
52 event details screen
54 event lobby entrance screen
56 event lobby screen
58 lobby card display screen
60, 61 profile display screen
62 profile amendment screen
64 user search screen
66 talk list screen
67, 68 mate talk screen
69 group talk screen
70 clipped event list screen
71 new talk creation screen
73 activity screen
75 notice screen
77 menu screen of other function
79 help screen
81 inquiry screen
83 setting screen

The invention claimed is:

1. A server, comprising:
a memory configured to store instructions; and
a central processing unit (CPU) configured to execute the instructions to:
receive a first profile of a first user and an interest signal indicating interest of the first user in a specific event;
receive identification information of the first user from a client;
store the first profile of the first user in the memory based on the identification information of the first user;
store the identification information in the memory in association with the specific event based on the interest signal;
search for a second user based on the identification information of the first user associated with the specific event, wherein the second user has a second profile similar to the received first profile of the first user;
create a group that comprises a plurality of users of similar interest, wherein
the interest of the plurality of users is associated with the specific event, and
the plurality of users includes the first user and the second user;
transmit first information associated with the created group to the client before an opening of the specific event;
receive an attendance signal, which indicates attendance of the first user at the specific event, from the client in response to a notification generated at the client, wherein
the notification prompts a user input at the client, and
the notification is generated at a first time before the opening of the specific event; and
store, in the memory, a history indicating the attendance of the first user at the specific event, based on the reception of the attendance signal.

2. The server according to claim 1, wherein
the CPU is further configured to receive second information that indicates meeting of the first user and the second user, based on the history of the attendance of the first user and a history of attendance of the second user at the specific event, and
register third information indicating that the first user and the second user are friends based on the reception of the second information.

3. The server according to claim 1, wherein
the CPU is further configured to control a plurality of clients associated with the plurality of users to execute group talk communication among the plurality of users included in the created group,
the group talk communication is via a network, and
the group talk communication is in a time range from the first time before the opening of the specific event to a second time after closing of the specific event.

4. The server according to claim 3, wherein
the CPU is further configured to control insertion of event information recommended to the created group into a group talk screen, and
the group talk screen presents content of the group talk.

5. The server according to claim 1, wherein
the CPU is further configured to permit, based on an input in a lobby card, access to an event lobby screen that presents third information of each user of the plurality of users who plans to attend the specific event, and
the input of the lobby card comprises fourth information of the first user associated with the specific event.

6. The server according to claim 5, wherein the event lobby screen includes an attendance button to transmit the attendance signal from the client to the server.

7. The server according to claim 5, wherein the event lobby screen includes the first information of the created group.

8. A client, comprising:
a memory configured to store instructions; and
a central processing unit (CPU) configured to execute the instructions to:
control a profile of a first user and an interest signal indicating interest of the first user in a specific event;
transmit the profile of the first user and the interest signal to a server;
transmit, to the server, identification information of the first user;
receive, before an opening of the specific event, first information associated with a group created by the server, wherein
the group is created based on the identification information of the first user associated with the specific event, and
the group comprises a plurality of users having a plurality of profiles similar to the profile of the first user;
generate a notification at a specific time before the opening of the specific event;
receive a user input based on the generated notification; and
transmit an attendance signal, which indicates attendance of the first user at the specific event, to the server in response to the received user input, wherein
the server stores a history indicating the attendance of the first user at the specific event, based on the transmitted attendance signal.

9. The client according to claim 8, wherein the CPU is further configured to:
transmit, to the server, second information indicating that the first user met a second user, and
receive, from the server, third information indicating that the first user and second user are registered as friends.

10. The client according to claim 8, further comprising a display control configured to control display of the first information of the group.

11. The client according to claim 10, wherein
the display control is further configured to control display of a group talk screen for group talk communication between the plurality of users included in the created group, and
the group talk communication is via a network.

12. The client according to claim 10, wherein
the display control is further configured to control display of a filling out screen for input to a lobby card,
the lobby card comprises user information associated with the specific event and third information associated with access of an event lobby screen, and
the third information is further associated with each user of the plurality of users who plans to attend the specific event.

13. The client according to claim 12, wherein
the event lobby screen includes an attendance button, and
the attendance button is associated with the transmission of the attendance signal to the server.

14. The client according to claim 12, wherein
the CPU is further configured to transmit, to the server, a signal indicating that the first user met a second user in the specific event, and
the event lobby screen includes a button associated with the transmission of the signal.

15. A control method, comprising:
receiving, by a server, a first profile of a first user and an interest signal indicating interest of the first user in a specific event;
receiving, by the server, identification information of the first user from a client;
storing, by the server in a memory, the first profile of the first user based on the identification information of the first user;
storing, by the server in the memory, the identification information of the first user in association with the specific event based on the interest signal;
searching, by the server, for a second user based on the identification information of the first user associated with the specific event, wherein the second user has a second profile similar to the received first profile of the first user;
creating, by the server, a group that comprises a plurality of users of similar interest, wherein
the interest of the plurality of users is associated with the specific event, and
the plurality of users includes the first user and the second user;
transmitting, by the server, information associated with the created group to the client before an opening of the specific event;
receiving an attendance signal, which indicates attendance of the first user at the specific event, from the client in response to a notification, wherein
the notification prompts a user input at the client, and
the notification is generated at the client at a specific time before the opening of the specific event; and
storing, by the server in the memory, a history indicating the attendance of the first user at the specific event, based on the reception of the attendance signal.

16. A non-transitory computer-readable medium having stored thereon, computer-executable instructions which when executed by a processor of a client, cause the processor to execute operations, the operations comprising:
controlling a profile of a user and an interest signal indicating interest of the user in a specific event;
transmitting the profile of the user and the interest signal to a server;
transmitting, to the server, identification information of the user;
receiving, before an opening of the specific event, first information associated with a group created by the server, wherein
the group is created based on the identification information of the user associated with the specific event, and
the group comprises a plurality of users having a plurality of profiles similar to the profile of the user;
generating a notification at a specific time before the opening of the specific event;
receiving a user input based on the generated notification; and
transmitting an attendance signal, which indicates attendance of the user at the specific event, to the server in response to the received user input, wherein
the server stores a history indicating the attendance of the user at the specific event, based on the transmitted attendance signal.

* * * * *